(12) United States Patent
Chen

(10) Patent No.: US 11,624,895 B2
(45) Date of Patent: Apr. 11, 2023

(54) LENS ASSEMBLY

(71) Applicants: Sintai Optical (Shenzhen) Co., Ltd., ShenZhen (CN); Asia Optical Co., Inc., Taichung (TW)

(72) Inventor: Po-Yu Chen, Taichung (TW)

(73) Assignees: SINTAI OPTICAL (SHENZHEN) CO., LTD., Shenzhen (CN); ASIA OPTICAL CO., LTD., Taichung (TW)

(*) Notice: Subject to any disclaimer, the term of this patent is extended or adjusted under 35 U.S.C. 154(b) by 282 days.

(21) Appl. No.: 17/001,878

(22) Filed: Aug. 25, 2020

(65) Prior Publication Data

US 2021/0080698 A1 Mar. 18, 2021

(30) Foreign Application Priority Data

Sep. 12, 2019 (CN) .................. 201910865796.X

(51) Int. Cl.
*G02B 13/00* (2006.01)
*G02B 27/00* (2006.01)
*G02B 9/62* (2006.01)

(52) U.S. Cl.
CPC .......... *G02B 13/0045* (2013.01); *G02B 9/62* (2013.01); *G02B 27/0025* (2013.01)

(58) Field of Classification Search
CPC .............. G02B 13/006; G02B 13/0015; G02B 13/0045; G02B 15/146; G02B 27/0025; H04N 5/222; H04N 5/2254
USPC ......... 359/656–658, 708, 713, 749, 756–762
See application file for complete search history.

(56) References Cited

U.S. PATENT DOCUMENTS

| | | | |
|---|---|---|---|
| 3,963,325 A | 6/1976 | Takahashi | |
| 8,441,746 B2 | 5/2013 | Hsieh et al. | |
| 8,891,183 B2 | 11/2014 | Tsai et al. | |
| 9,207,431 B2 | 12/2015 | Lee et al. | |
| 2016/0011403 A1* | 1/2016 | Asami | G02B 9/62 |
| | | | 359/740 |
| 2016/0085054 A1* | 3/2016 | Asami | G02B 9/64 |
| | | | 359/755 |
| 2020/0249432 A1* | 8/2020 | Bao | G02B 9/62 |

FOREIGN PATENT DOCUMENTS

| | | | | |
|---|---|---|---|---|
| CN | 105143946 A | | 12/2015 | |
| CN | 107121756 A | * | 9/2017 | ......... G02B 13/0045 |
| CN | 109445067 A | | 3/2019 | |
| CN | 109946814 A | * | 6/2019 | |

(Continued)

*Primary Examiner* — Travis S Fissel
(74) *Attorney, Agent, or Firm* — McClure, Qualey & Rodack, LLP

(57) ABSTRACT

A lens assembly includes sequentially from an object side to an image side along an optical axis a first lens, a second lens, a third lens, a fourth lens, a fifth lens, and a sixth lens. The first lens has refractive power and includes a convex surface facing an object side. The second lens has positive refractive power. The third lens has positive refractive power. The fourth lens has refractive power. The fifth lens has refractive power. The sixth lens has positive refractive power and includes a convex surface facing the object side. The lens assembly satisfies the following condition: $0.2<|f_5/f|<1.5$; wherein $f_5$ is an effective focal length of the fifth lens and f is an effective focal length of the lens assembly.

20 Claims, 24 Drawing Sheets

(56) References Cited

FOREIGN PATENT DOCUMENTS

| | | |
|---|---|---|
| KR | 1020150072511 A | 6/2015 |
| TW | 201235731 A | 9/2012 |
| TW | I448721 B | 8/2014 |

\* cited by examiner

LENS ASSEMBLY

BACKGROUND OF THE INVENTION

Field of the Invention

The present disclosure is related to a lens assembly.

Description of the Related Art

The development of lens assembly nowadays is tending toward having a large aperture. Additionally, the lens assembly is developed to have high resolution and resistance to environmental temperature change in accordance with different application requirements. However, the known lens assembly can't satisfy such requirements. Therefore, the lens assembly needs a new structure in order to meet the requirements of large aperture, high resolution, and resistance to environmental temperature change at the same time.

BRIEF SUMMARY OF THE INVENTION

The invention provides a lens assembly to solve the above problems. The lens assembly of the invention is provided with characteristics of a decreased F-number, an increased resolution, a resisted environmental temperature change, and still has a good optical performance.

According to an embodiment, the present disclosure provides a lens assembly including a first lens, a second lens, a third lens, a fourth lens, a fifth lens and a sixth lens. The first lens has refractive power and includes a convex surface facing an object side. The second lens has positive refractive power. The third lens has positive refractive power. The fourth lens has refractive power. The fifth lens has refractive power. The sixth lens has positive refractive power and includes a convex surface facing the object side. The first to sixth lenses are arranged in order from the object side to an image side along an optical axis. The lens assembly satisfies: $0.2<|f_5/f|<1.5$; wherein $f_5$ is a focal length in mm of the fifth lens and f is an effective focal length in mm of the lens assembly.

According to another embodiment, the present disclosure provides a lens assembly including a first lens, a second lens, a third lens, a fourth lens, a fifth lens and a sixth lens. The first lens has refractive power and includes a convex surface facing an object side. The second lens has positive refractive power. The third lens has positive refractive power. The fourth lens has refractive power. The fifth lens has refractive power. The sixth lens has positive refractive power and includes a convex surface facing the object side. The first to sixth lenses are arranged in order from the object side to an image side along an optical axis. The lens assembly satisfies: 21.2 mm$<f+f_6<$23.6 min; wherein $f_6$ is a focal length in mm of the sixth lens and f is an effective focal length in min of the lens assembly.

In one of the above embodiments, the fifth lens has positive refractive power and includes a convex surface facing the object side and a convex surface facing the image side.

In one of the above embodiments, the fourth lens has negative refractive power and includes a concave surface facing the object side and a concave surface facing the image side.

In one of the above embodiments, the second lens further includes a convex surface facing the object side and a convex surface facing the image side.

In one of the above embodiments, the third lens further includes a convex surface facing the object side and a concave surface facing the image side.

In one of the above embodiments, the first lens has negative refractive power and includes a concave surface facing the image side.

In one of the above embodiments, the sixth lens further includes a convex surface facing the image side.

In one of the above embodiments, the sixth lens further includes a plane surface facing the image side.

In one of the above embodiments, the lens assembly further includes a stop disposed between the third lens and the fourth lens.

In one of the above embodiments, the fourth lens and the fifth lens are cemented together.

In one of the above embodiments, the lens assembly further satisfies at least one of the following conditions: $0.8<|f_1/f|<2.9$; $0.5<|f_2/f|<2.6$; $0.2<|f_4/f|<1.5$; $0.2<|f_5/f|<1.5$; $0.3<|f_6/f|<2.4$; $0.1<|BFL/TTL|<0.6$; wherein $f_1$ is an effective focal length in mm of the first lens, $f_2$ is an effective focal length in mm of the second lens, $f_4$ is an effective focal length in mm of the fourth lens, $f_5$ is an effective focal length in mm of the fifth lens, $f_6$ is an effective focal length in mm of the sixth lens, f is an effective focal length in mm of the lens assembly, BFL is an interval in mm from an image side surface of the sixth lens to the image plane along the optical axis, and TTL is an interval in mm from an object side surface of the first lens to the image plane along the optical axis.

In one of the above embodiments, the lens assembly further satisfies at least one of the following conditions: $-10$ mm$<f+f_1<-7$ mm; 24 mm$<f+f_2<25$ mm; 103.7 mm$<f+f_3<199.8$ mm; 4.5 mm$<f+f_4<5.7$ mm; 14.5 mm$<+f+f_5<15$ mm; 21.2 mm$<f+f_6<23.6$ mm; wherein $f_1$ is an effective focal length in mm of the first lens, $f_2$ is an effective focal length in mm of the second lens, $f_3$ is an effective focal length in mm of the third lens, $f_4$ is an effective focal length in mm of the fourth lens, $f_5$ is an effective focal length in mm of the fifth lens, $f_6$ is an effective focal length in mm of the sixth lens, and f is an effective focal length in mm of the lens assembly.

The above objects, features and advantages of the present disclosure will be more clearly understood from the following detailed description taken in conjunction with exemplary embodiments and the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens and a sixth lens. The first lens has refractive power and includes a convex surface facing an object side. The second lens has positive refractive power. The third lens has positive refractive power. The fourth lens has refractive power. The fifth lens has refractive power. The sixth lens has positive refractive power and includes a convex surface facing the object side. The first to sixth lenses are arranged in order from the object side to an image side along an optical axis. The lens assembly satisfies: $0.2<|f_5/f|<1.5$; wherein $f_5$ is a focal length in tarn of the fifth lens and f is an effective focal length in mm of the lens assembly.

The present invention provides another lens assembly including a first lens, a second lens, a third lens, a fourth lens, a fifth lens and a sixth lens. The first lens has refractive power and includes a convex surface facing an object side. The second lens has positive refractive power. The third lens has positive refractive power. The fourth lens has refractive power. The fifth lens has refractive power. The sixth lens has positive refractive power and includes a convex surface facing the object side. The first to sixth lenses are arranged in order from the object side to an image side along an optical axis. The lens assembly satisfies: $21.2 \text{ mm} < f + f_6 < 23.6 \text{ mm}$; wherein $f_6$ is a focal length in mm of the sixth lens and f is an effective focal length in mm of the lens assembly.

Referring to Table 1, Table 3, and Table 5, wherein Table 1, Table 3, and Table 5 show optical specification in accordance with a first, second, and third embodiments of the invention respectively.

Figure 1:
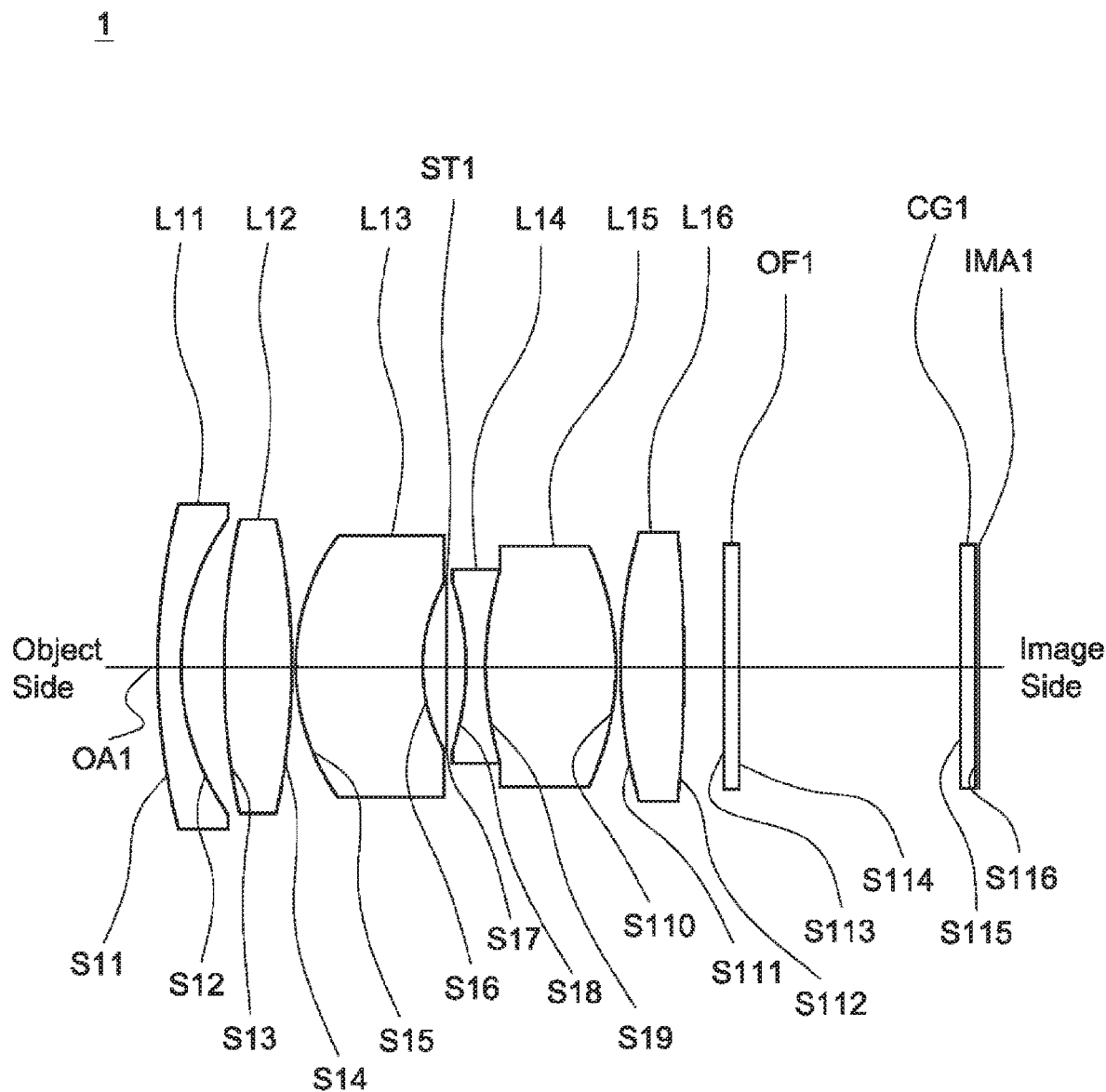
FIG. 1 is a schematic diagram illustrating the lens arrangement of a lens assembly according to the first embodiment of the present disclosure.
Figure 3:
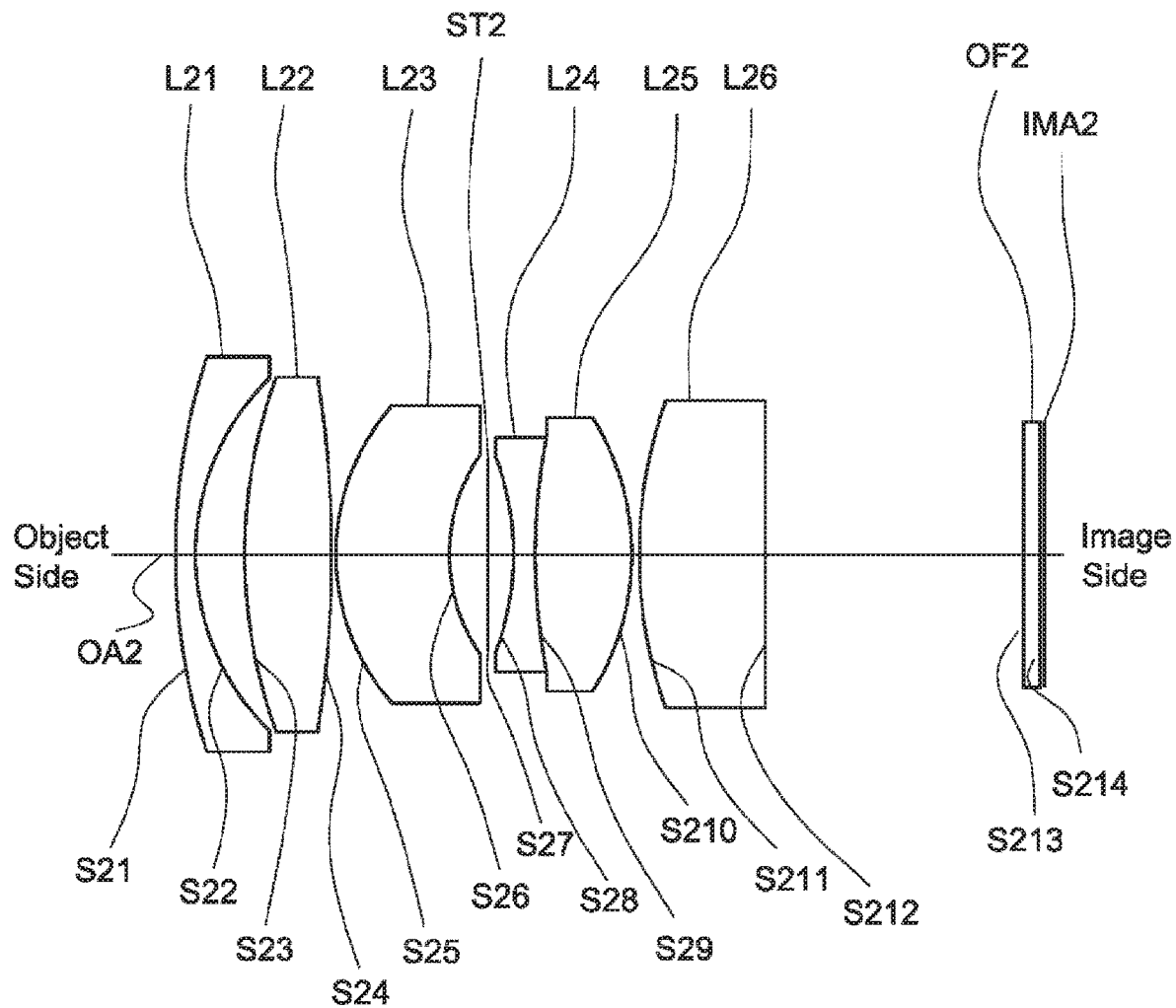
FIG. 3 is a schematic diagram illustrating the lens arrangement of a lens assembly according to the second embodiment of the present disclosure.
Figure 5:
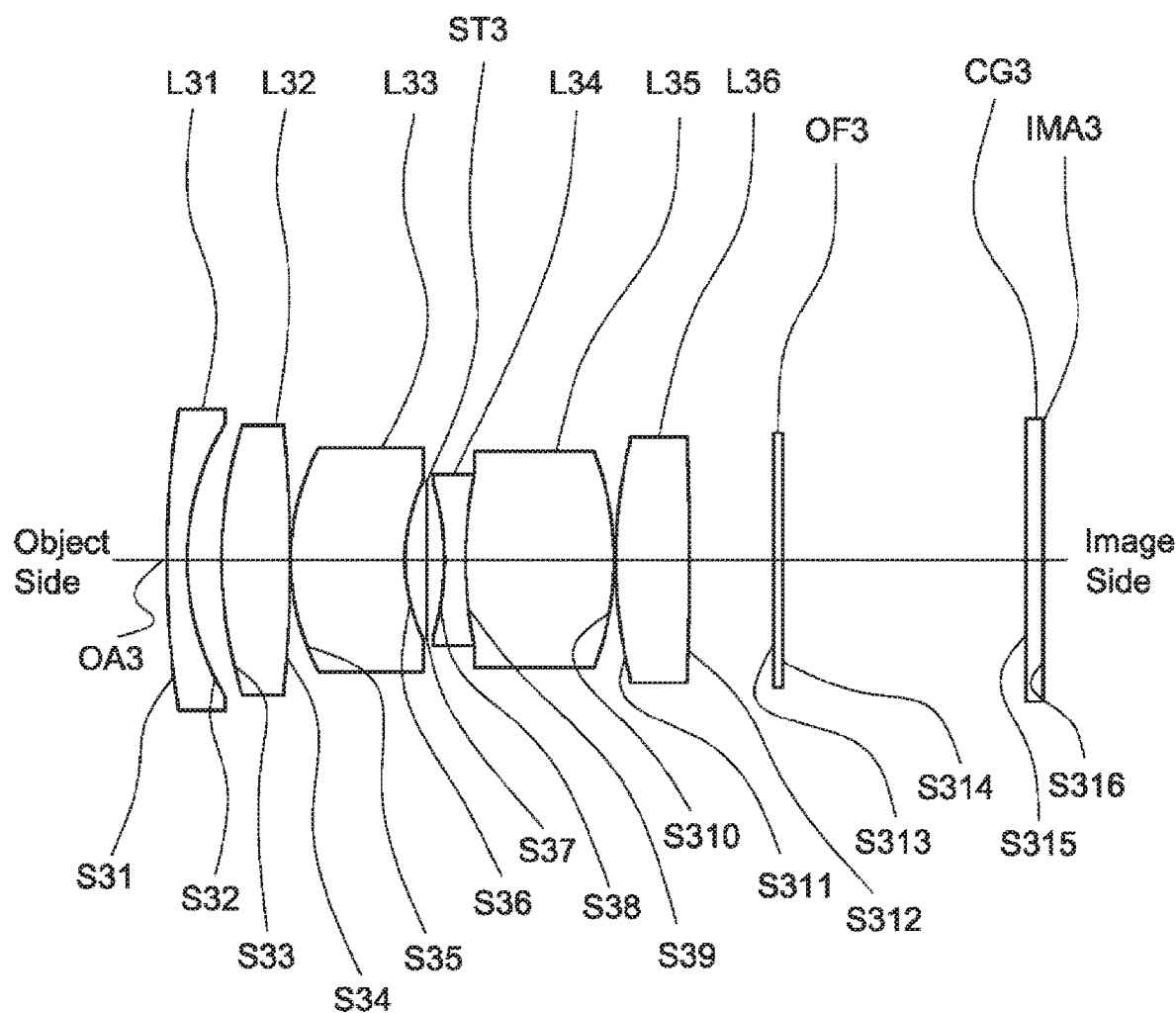
FIG. 5 is a schematic diagram illustrating the lens arrangement of a lens assembly according to the third embodiment of the present disclosure.

FIG. 1, FIG. 3, and FIG. 5 are lens layout and optical path diagrams of the lens assembly in accordance with the first, second, and third embodiments of the invention respectively.

The first lens L11, L21, L31 are meniscus lenses with negative refractive power and made of glass material, wherein the object side surfaces S11, S21, S31 are convex surfaces, the image side surfaces S12, S22, S32 are concave surfaces, and the object side surfaces S11, S21, S31 and the image side surfaces S12, S22, S32 are spherical surfaces.

The second lens L12, L22, L32 are biconvex lenses with positive refractive power and made of glass material, wherein the object side surfaces S13, S23, S33 are convex surfaces, the image side surfaces S14, S24, S34 are convex surfaces, and the object side surfaces S13, S23, S33 and the image side surfaces S14, S24, S34 are spherical surfaces.

The third lens L13, L23, L33 are meniscus lenses with positive refractive power and made of glass material, wherein the object side surfaces S15, S25, S35 are convex surfaces, the image side surfaces S16, S26, S36 are concave surfaces, and the object side surfaces S15, S25, S35 and the image side surfaces S16, S26, S36 are spherical surfaces.

The fourth lens L14, L24, L34 are biconcave lenses with negative refractive power and made of glass material, wherein the object side surfaces S18, S28, S38 are concave surfaces, the image side surfaces S19, S29, S39 are concave surfaces, and the object side surfaces S18, S28, S38 and the image side surfaces S19, S29, S39 are spherical surfaces.

The fifth lens L15, L25, L35 are biconvex lenses with positive refractive power and made of glass material, wherein the object side surfaces S19, S29, S39 are convex surfaces, the image side surfaces S110, S210, S310 are convex surfaces, and the object side surfaces S19, S29, S39 and the image side surfaces S110, S210, S310 are spherical surfaces.

The sixth lens L16, L26, L36 are with positive refractive power and made of glass material, wherein the object side surfaces S111, S211, S311 are convex surfaces, the object side surfaces S111, S211, S311 are spherical surfaces.

The fourth lenses L14, L24, L34 and the fifth lenses L15, L25, L35 are cemented respectively.

In addition, the lens assembly 1, 2, 3 satisfy at least one of the following conditions:

$$0.2 < f_5/f < 1.5 \quad (1)$$

$$0.8 < |f_1/f| < 2.9 \quad (2)$$

$$0.5 < |f_2/f| < 2.6 \quad (3)$$

$$0.2 < |f_4/f| < 1.5 \quad (4)$$

$$0.3 < |f_6/f| < 2.4 \quad (5)$$

$$-10 \text{ mm} < f + f_1 < -7 \text{ mm} \quad (7)$$

$$24 \text{ mm} < f + f_2 < 25 \text{ mm} \quad (8)$$

$$103.7 \text{ mm} < f + f_3 < 199.8 \text{ mm} \quad (9)$$

$$4.5 \text{ mm} < f + f_4 < 5.7 \text{ mm} \quad (10)$$

$$14.5 < f + f_5 < 15 \text{ mm} \quad (11)$$

$$21.2 \text{ mm} < f + f_6 < 23.6 \text{ mm} \quad (12)$$

wherein $f_1$ is an effective focal length of the first lenses L11, L21, L31 for the first to third embodiments, $f_2$ is an effective focal length of the second lenses L12, L22, L32 for the first to third embodiments, $f_3$ is an effective focal length of the third lenses L13, L23, L33 for the first to third embodiments, $f_4$ is an effective focal length of the fourth lenses L14, L24, L34 for the first to third embodiments, $f_5$ is an effective focal length of the fifth lenses L15, L25, L35 for the first to third embodiments, $f_6$ is an effective focal length of the sixth lenses L16, L26, L36 for the first to third embodiments, f is an effective focal length of the lens assemblies 1, 2, 3 for the first to third embodiments, BFL is an interval in mm from the image side surfaces S112, S212, S312 of the sixth lenses L16, L26, L36 to the image planes IMA1 IMA2, IMA3 along the optical axes OA1, OA2, OA3 respectively for the first to third embodiments, and TTL is an interval in mm from the object side surfaces S11, S21, S31 of the first lenses L11, L21, L31 to the image planes IMA1, IMA2, IMA3 along the optical axes OA1, OA2, OA3 respectively for the first to third embodiments. With the lens assemblies 1, 2, 3 satisfying at least one of the above conditions (1)-(12), the F-number can be effectively decreased, the resolution can be effectively increased, the environmental temperature change can be effectively resisted, the aberration can be effectively corrected, and the chromatic aberration can be effectively corrected.

A detailed description of a lens assembly in accordance with a first embodiment of the invention is as follows. Referring to FIG. 1, the lens assembly 1 includes a first lens L11, a second lens L12, a third lens L13, a stop ST1, a fourth lens L14, a fifth lens L15, a sixth lens L16, an optical filter OF1, and a cover glass CG1, all of which are arranged in order from an object side to an image side along an optical axis OA1, In operation, an image of light rays from the object side is formed at an image plane MAL According to the foregoing, wherein: the sixth lens L16 is a biconvex lens, wherein the image side surface S112 is a convex surface, the image side surface S112 is a spherical surface; both of the object side surface S113 and image side surface S114 of the optical filter OF1 are plane surfaces; and both of the object side surface S115 and image side surface S116 of the cover glass CG1 are plane surfaces.

With the above design of the lenses and stop ST1 and at least any one of the conditions (1)-(12) satisfied, the lens assembly 1 can have an effective decreased F-number, an effective increased resolution, an effective resisted environmental temperature change, an effective corrected aberration, and is capable of an effective corrected chromatic aberration.

Table 1 shows the optical specification of the lens assembly 1 in FIG. 1.

TABLE 1

Effective Focal Length = 9.604 mm
F-number = 1.6
Total Lens Length = 21.03 mm
Field of View = 56.8 degrees

| Surface Number | Radius of Curvature (mm) | Thickness (mm) | Nd | Vd | Effective Focal Length (mm) | Remark |
|---|---|---|---|---|---|---|
| S11 | 17.40409 | 0.6 | 1.589 | 61.14 | −19.097 | The First Lens L11 |
| S12 | 6.757971 | 1.067547 | | | | |
| S13 | 17.92946 | 1.758031 | 1.595 | 67.74 | 15.301 | The Second Lens L12 |
| S14 | −17.9295 | 0.1 | | | | |
| S15 | 5.783703 | 3.242689 | | | 98.444 | The Third Lens L13 |
| S16 | 4.508212 | 0.613971 | 1.921 | 23.96 | | |
| S17 | ∞ | 0.503959 | | | | Stop ST1 |
| S18 | −6.74197 | 0.5 | 1.923 | 20.88 | −4.007 | The Fourth Lens L14 |
| S19 | 8.645786 | 3.343087 | 1.871 | 40.73 | 4.996 | The Fifth Lens L15 |
| S110 | −7.24012 | 0.1 | | | | |
| S111 | 12.70731 | 1.650839 | 1.772 | 49.6 | 11.881 | The Sixth Lens L16 |
| S112 | −31.5851 | 1 | | | | |
| S113 | ∞ | 0.4 | 1.517 | 64.17 | | Optical Filter OF1 |
| S114 | ∞ | 5.649167 | | | | |
| S115 | ∞ | 0.4 | 1.517 | 64.17 | | Cover Glass CG1 |
| S116 | ∞ | 0.1 | | | | |

Table 2 shows the parameters and condition values for conditions (1)-(12) in accordance with the first embodiment of the invention. It can be seen from Table 2 that the lens assembly 1 of the first embodiment satisfies the conditions (1)-(12).

TABLE 2

| BFL | 7.549 mm | | | | |
|---|---|---|---|---|---|
| $|f_1/f|$ | 1.988 | $|f_2/f|$ | 1.593 | $|f_4/f|$ | 0.417 |
| $|f_5/f|$ | 0.520 | $|f_6/f|$ | 1.237 | $|BFL/TTL|$ | 0.358983 |
| $f + f_1$ | −9.49 mm | $f + f_2$ | 24.91 mm | $f + f_3$ | 108.05 mm |
| $f + f_4$ | 5.60 mm | $f + f_5$ | 14.60 mm | $f + f_6$ | 21.49 mm |

By the above arrangements of the lenses and stop ST1, the lens assembly 1 of the first embodiment can meet the requirements of optical performance as seen in FIGS. 2A-2G.

Figure 2A:
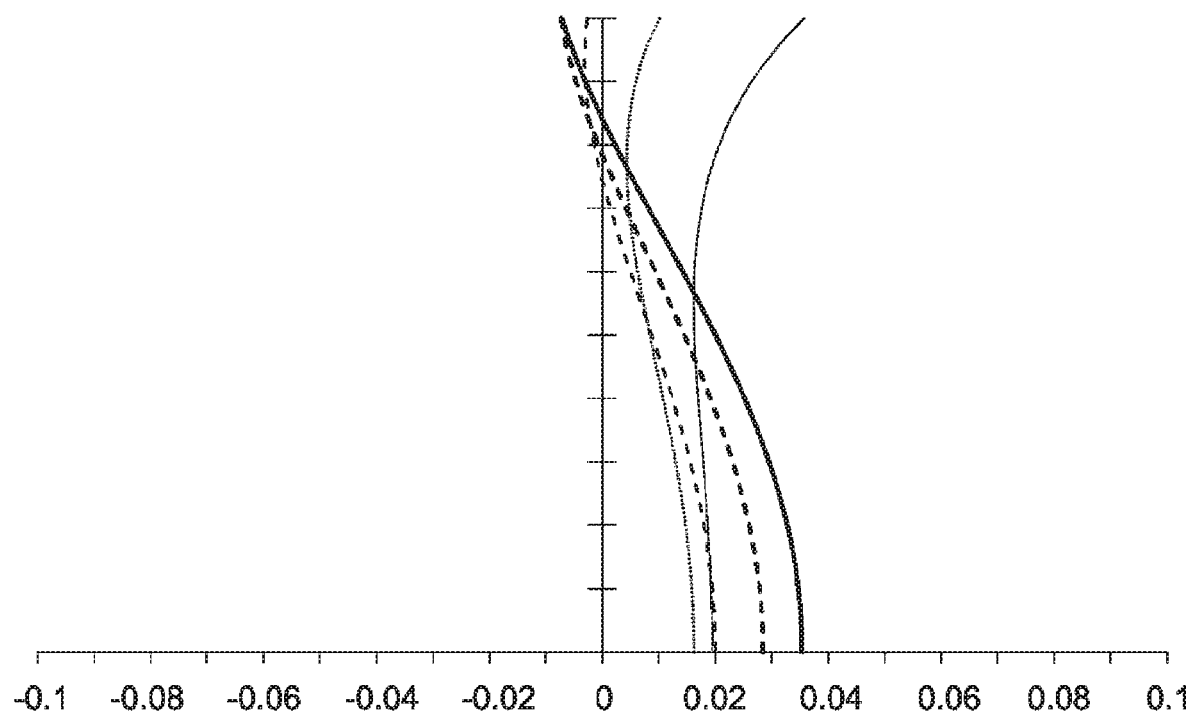
FIG. 2A is a schematic diagram illustrating the longitudinal aberration of the lens assembly according to the first embodiment of the present disclosure.
Figure 2B:
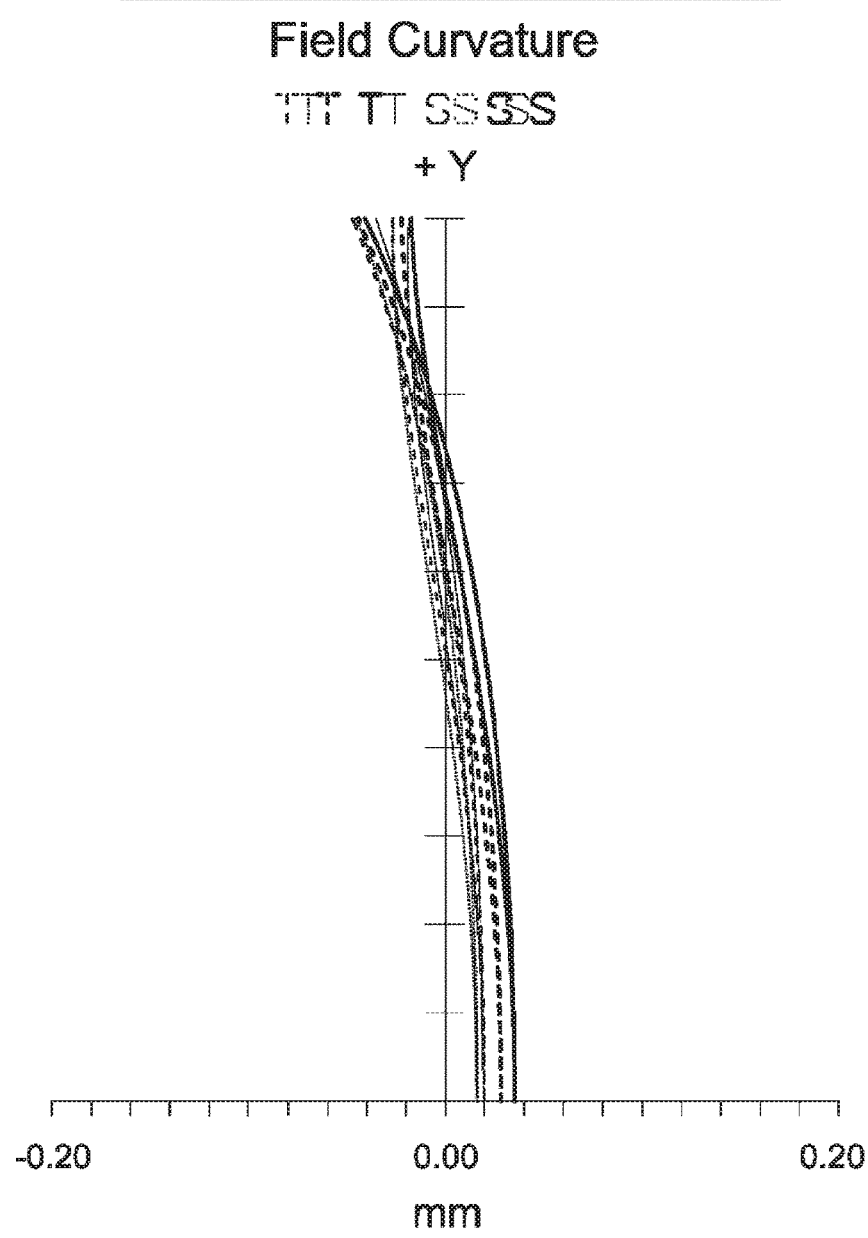
FIG. 2B is a schematic diagram illustrating the field curvature of the lens assembly according to the first embodiment of the present disclosure.
Figure 2C:
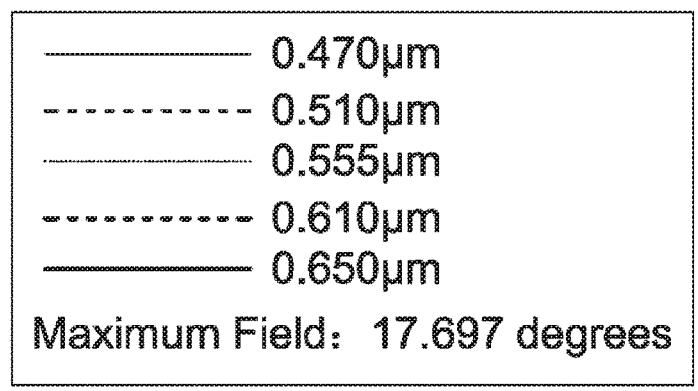
FIG. 2C is a schematic diagram illustrating the distortion of the lens assembly according to the first embodiment of the present disclosure.
Figure 2C:
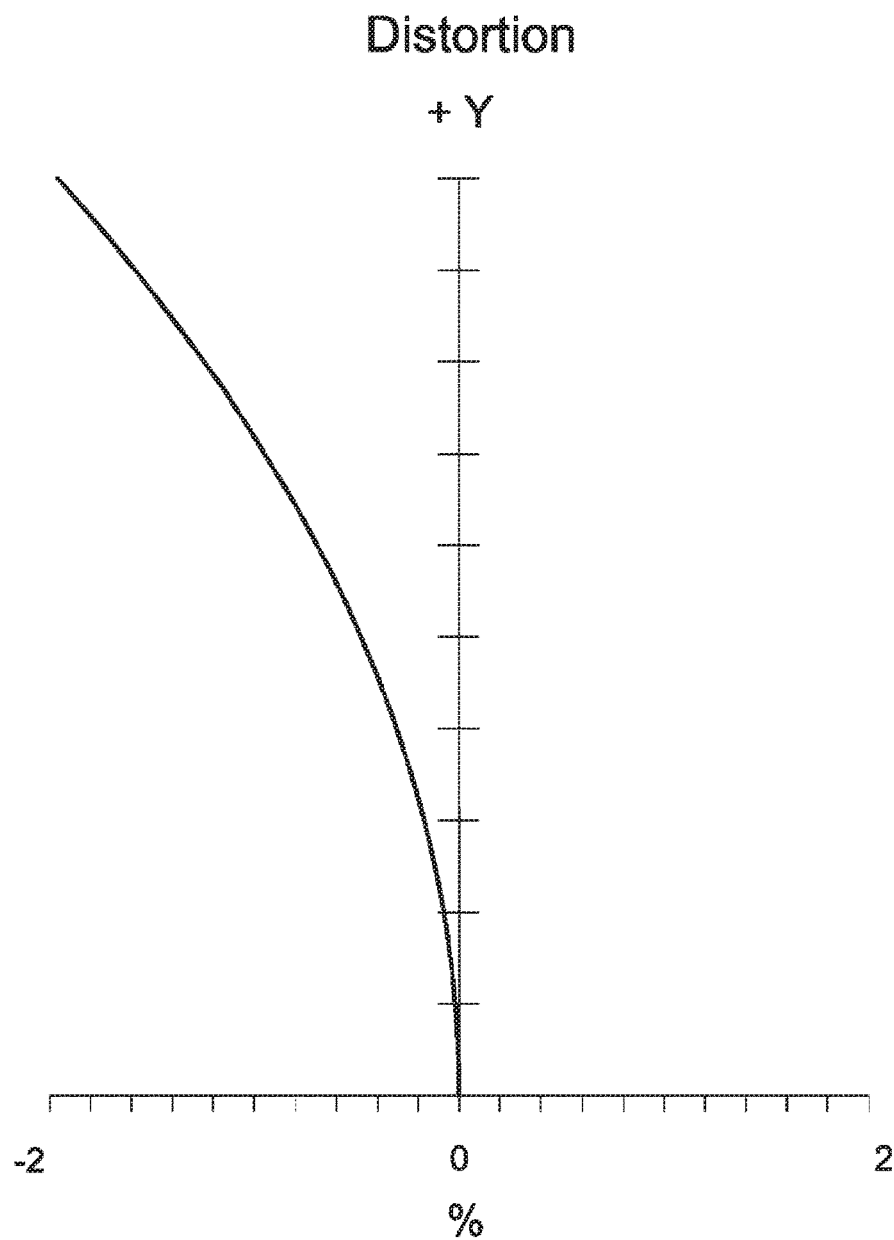
Figure 2D:
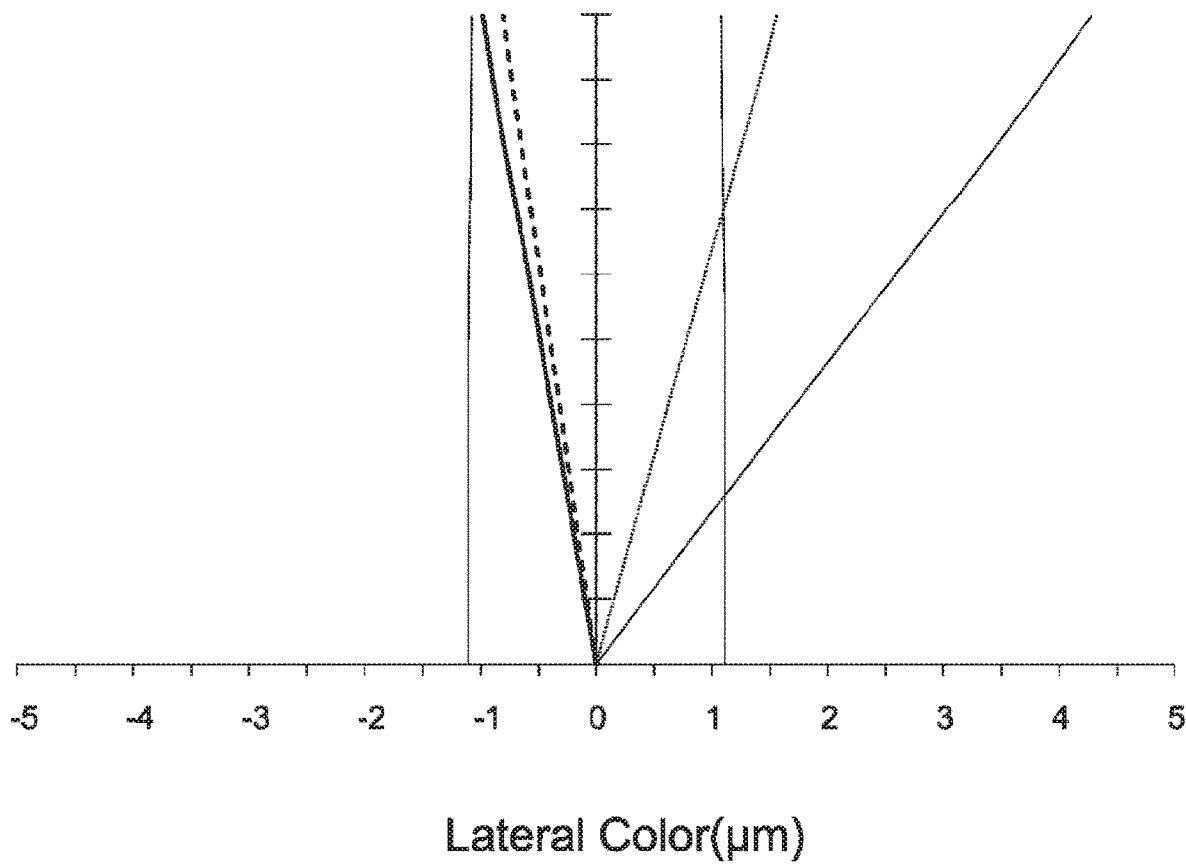
FIG. 2D is a schematic diagram illustrating the lateral color of the lens assembly according to the first embodiment of the present disclosure.
Figure 2E:
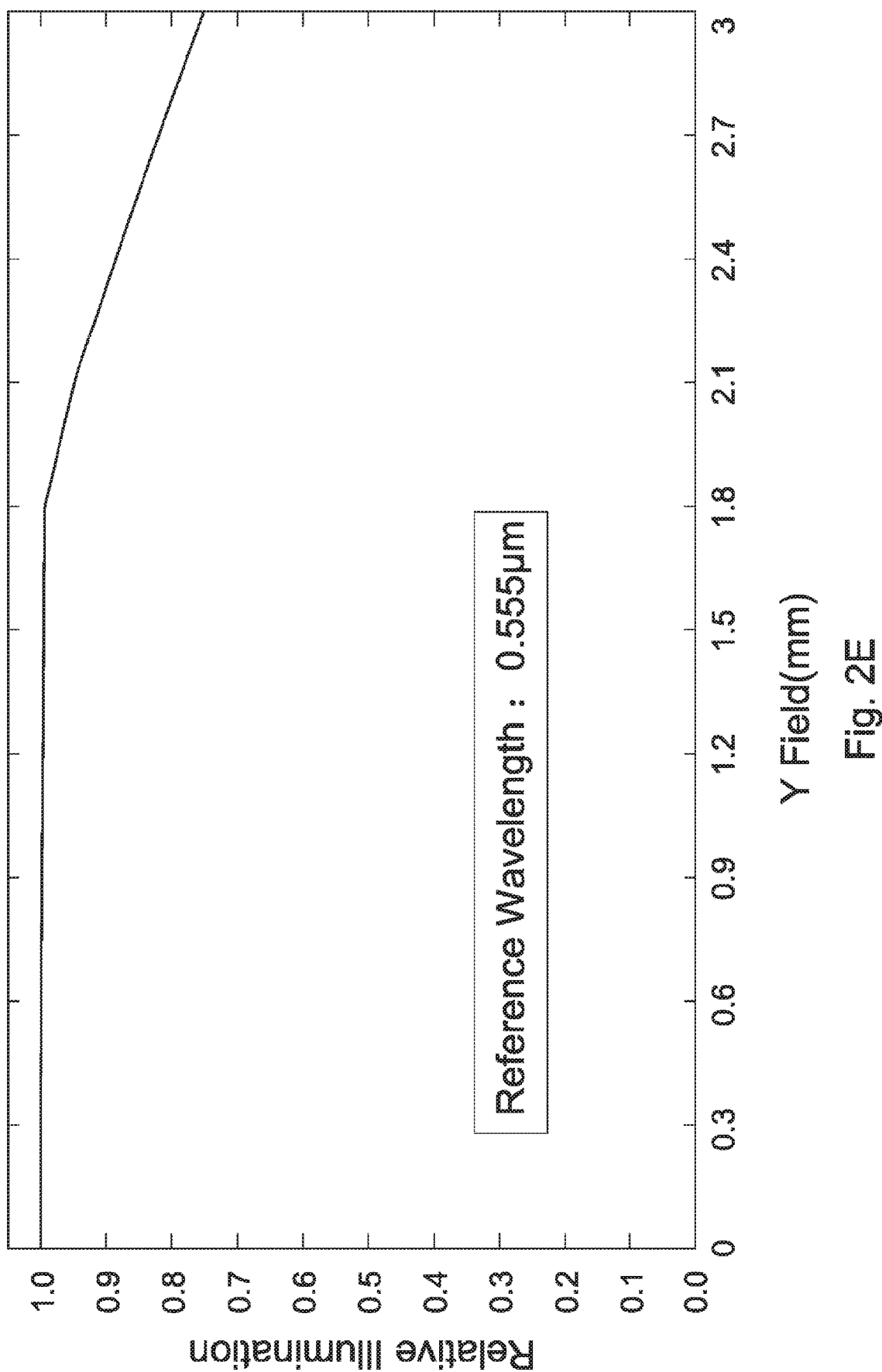
FIG. 2E is a schematic diagram illustrating the relative illumination of the lens assembly according to the first embodiment of the present disclosure.
Figure 2F:
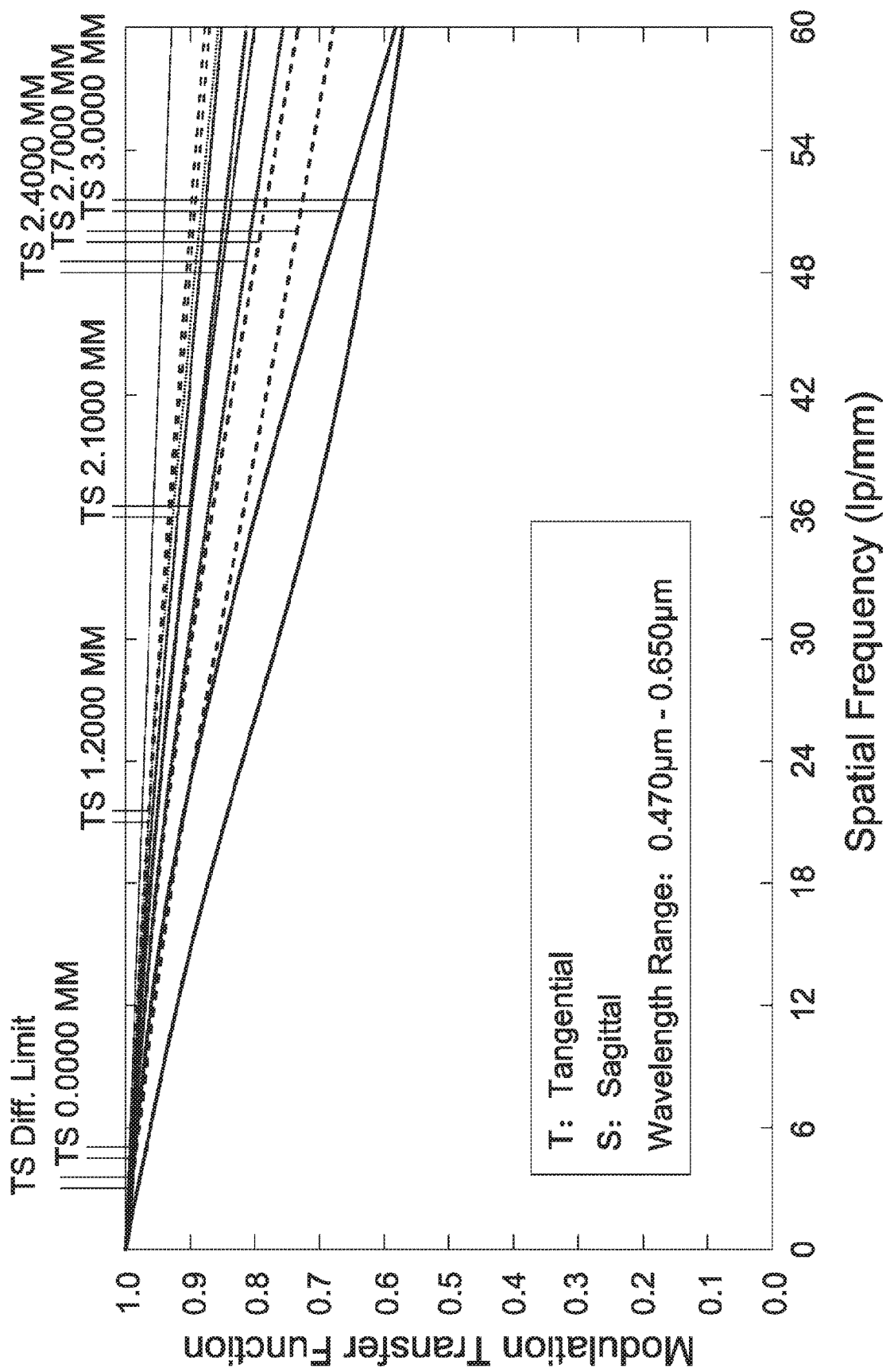
FIG. 2F is a schematic diagram illustrating the modulation transfer function of the lens assembly according to the first embodiment of the present disclosure.
Figure 2G:
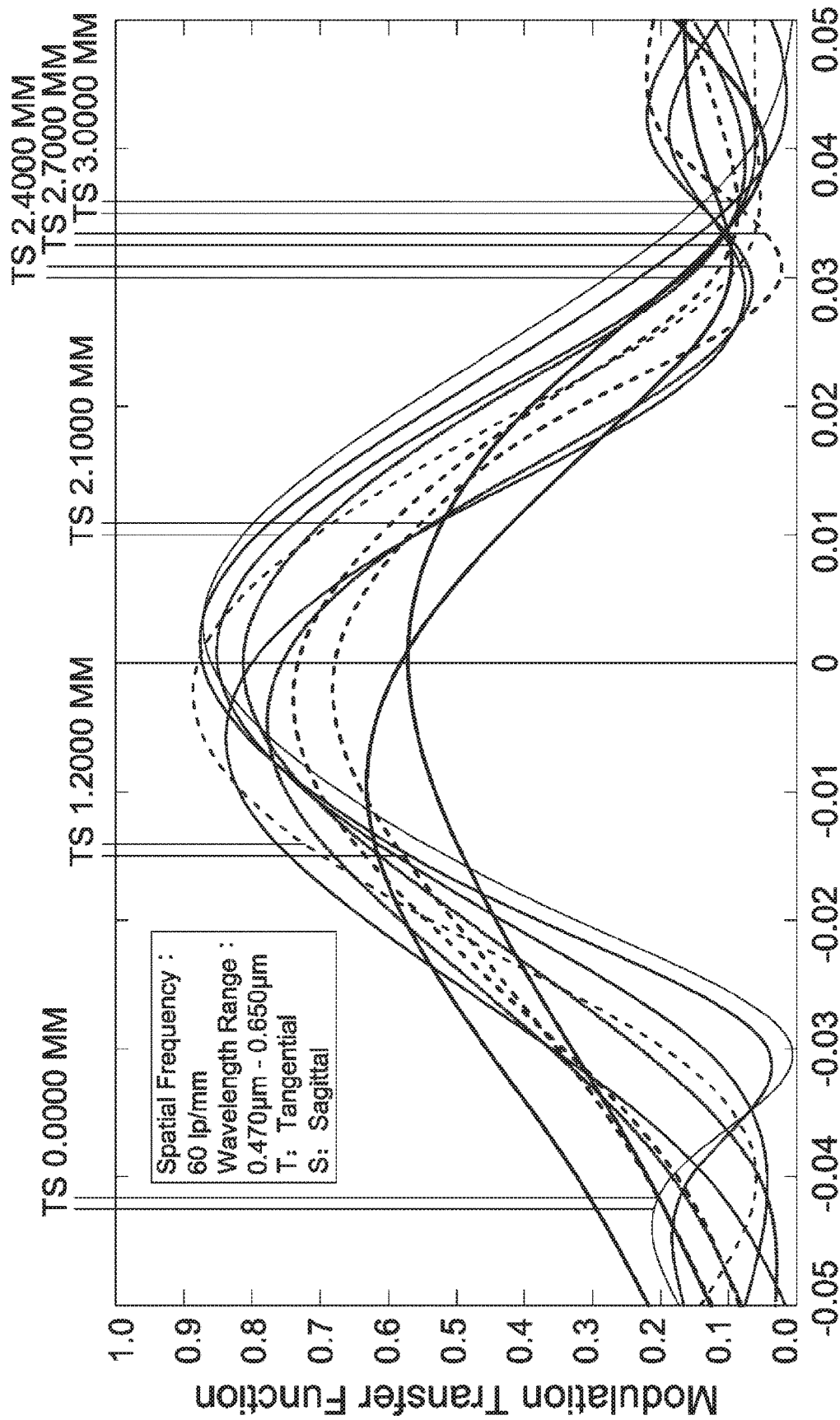
FIG. 2G is a schematic diagram illustrating the through focus modulation transfer function of the lens assembly according to the first embodiment of the present disclosure.

It can be seen from FIG. 2A that the longitudinal aberration amount in the lens assembly 1 of the first embodiment ranges from −0.01 mm to 0.04 mm. It can be seen from FIG. 2B that the field curvature amount in the lens assembly 1 of the first embodiment ranges from −0.06 mm to 0.04 mm. It can be seen from FIG. 2C that the distortion in the lens assembly 1 of the first embodiment ranges from −2% to 0%. It can be seen from FIG. 2D that the lateral color in the lens assembly 1 of the first embodiment ranges from −1.0 μm to 4.5 μm. It can be seen from FIG. 2E that the relative illumination in the lens assembly 1 of the first embodiment ranges from 0.76 to 1.0. It can be seen from FIG. 2F that the modulation transfer function in the lens assembly 1 of the first embodiment ranges from 0.58 to 1.0. It can be seen from FIG. 2G that the through focus modulation transfer function of tangential direction and sagittal direction in the lens assembly 1 of the first embodiment ranges from 0.0 to 0.9 as focus shift ranges from −0.05 mm to 0.05 mm.

It is obvious that the longitudinal aberration, the field curvature, the distortion and the lateral color of the lens assembly 1 of the first embodiment can be corrected effectively, and the relative illumination, the resolution and the depth of focus of the lens assembly 1 of the first embodiment can meet the requirement. Therefore, the lens assembly 1 of the first embodiment is capable of good optical performance.

Referring to FIG. 3, FIG. 3 is a lens layout and optical path diagram of a lens assembly in accordance with a second embodiment of the invention. The lens assembly 2 includes a first lens L21, a second lens L22, a third lens L23, a stop ST2, a fourth lens L24, a fifth lens L25, a sixth lens L26, an optical filter OF2, and a cover glass CG2, all of which are arranged in order from an object side to an image side along an optical axis OA2. In operation, an image of light rays from the object side is formed at an image plane IMA2.

According to the foregoing, wherein: the sixth lens L26 is a plane-convex lens, wherein the image side surface S212 is a plane surface; and both of the object side surface S213 and image side surface S214 of the optical filter OF2 are plane surfaces.

With the above design of the lenses and stop ST2 and at least any one of the conditions (1)-(12) satisfied, the lens assembly 2 can have an effective decreased F-number, an effective increased resolution, an effective resisted environmental temperature change, an effective corrected aberration, and is capable of an effective corrected chromatic aberration.

Table 3 shows the optical specification of the lens assembly 2 in FIG. 3.

TABLE 3

Effective Focal Length = 9.616 mm
F-number = 1.6
Total Lens Length = 20.894 mm
Field of View = 56.8 degrees

| Surface Number | Radius of Curvature (mm) | Thickness (mm) | Nd | Vd | Effective Focal Length (mm) | Remark |
|---|---|---|---|---|---|---|
| S21 | 15.43952 | 0.500876 | 1.589 | 61.27 | −17.149 | The First Lens L21 |
| S22 | 6.044219 | 1.169401 | | | | |
| S23 | 12.65006 | 2.10206 | 1.595 | 67.74 | 14.578 | The Second Lens L22 |
| S24 | −26.1397 | 0.099984 | | | | |
| S25 | 5.504889 | 2.722159 | 1.921 | 23.96 | 185.763 | The Third Lens L23 |
| S26 | 4.332921 | 0.925681 | | | | |
| S27 | ∞ | 0.602602 | | | | Stop ST2 |
| S28 | −6.71761 | 0.52321 | 1.923 | 20.88 | −4.92 | The Fourth Lens L24 |
| S29 | 14.93052 | 2.335308 | 1.871 | 40.73 | 5.305 | The Fifth Lens L25 |
| S210 | −6.2399 | 0.160343 | | | | |
| S211 | 10.74703 | 3.045662 | 1.773 | 49.46 | 13.861 | The Sixth Lens L26 |
| S212 | ∞ | 6.207023 | | | | |
| S213 | ∞ | 0.4 | 1.517 | 64.17 | | Optical Filter OF2 |
| S214 | ∞ | 0.1 | | | | |

Table 4 shows the parameters and condition values for conditions (1)-(12) in accordance with the first embodiment of the invention. It can be seen from Table 4 that the lens assembly 2 of the second embodiment satisfies the conditions (1)-(12).

TABLE 4

| BFL | 6.707 mm | | | | |
|---|---|---|---|---|---|
| $|f_1/f|$ | 1.783 | $|f_2/f|$ | 1.516 | $|f_4/f|$ | 0.512 |
| $|f_5/f|$ | 0.552 | $|f_6/f|$ | 1.441 | $|BFL/TTL|$ | 0.320998 |

TABLE 4-continued

| $f + f_1$ | −7.53 mm | $f + f_2$ | 24.19 mm | $f + f_3$ | 195.38 mm |
|---|---|---|---|---|---|
| $f + f_4$ | 4.70 mm | $f + f_5$ | 14.92 mm | $f + f_6$ | 23.48 mm |

By the above arrangements of the lenses and stop ST2, the lens assembly 2 of the second embodiment can meet the requirements of optical performance as seen in FIGS. 4A-4G.

Figure 4A:
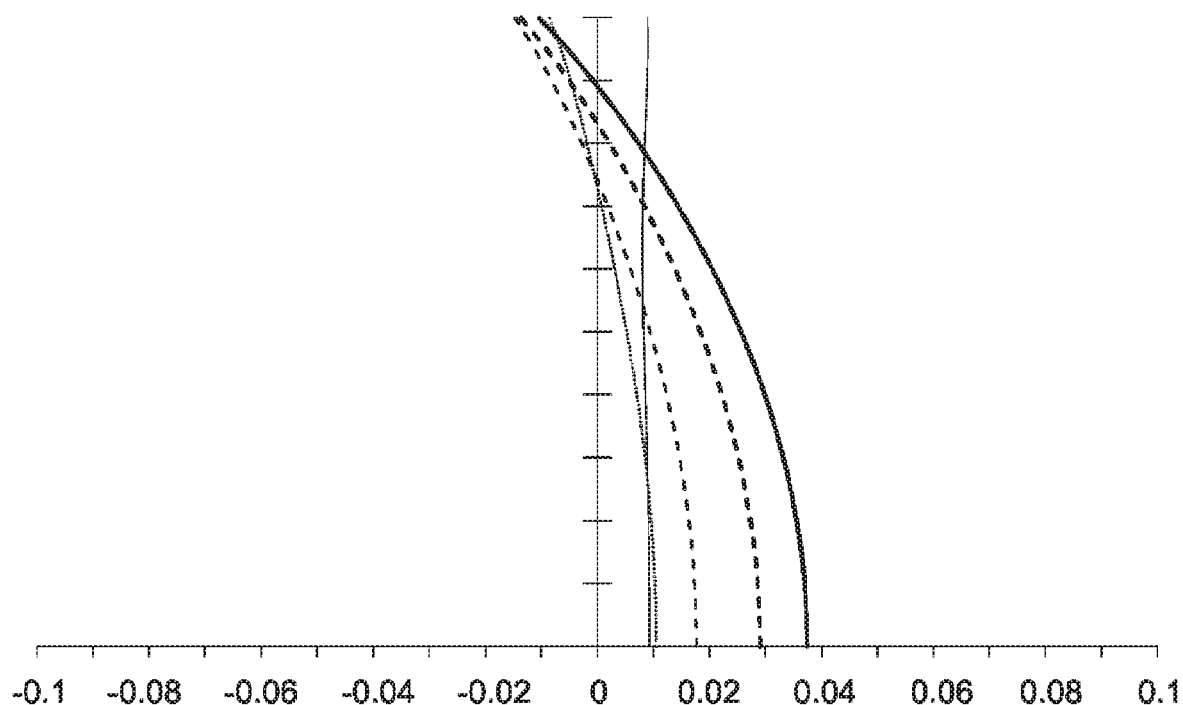
FIG. 4A is a schematic diagram illustrating the longitudinal aberration of the lens assembly according to the second embodiment of the present disclosure.
Figure 4B:
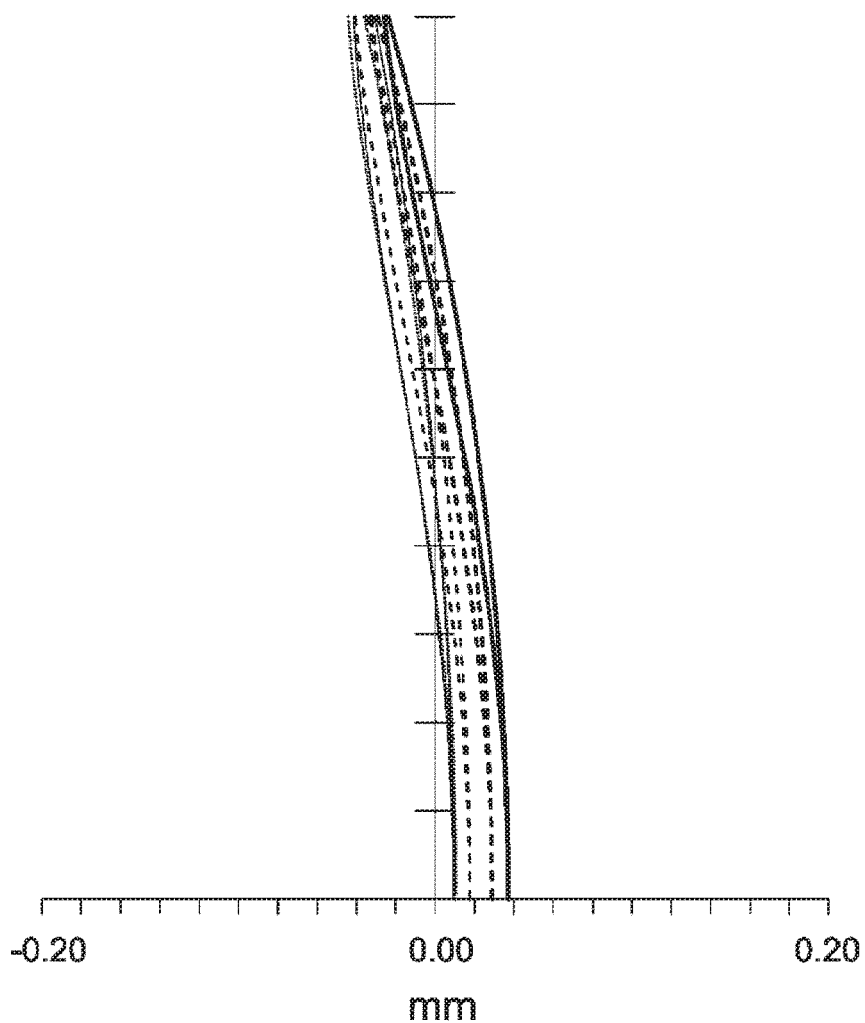
FIG. 4B is a schematic diagram illustrating the field curvature of the lens assembly according to the second embodiment of the present disclosure.
Figure 4C:
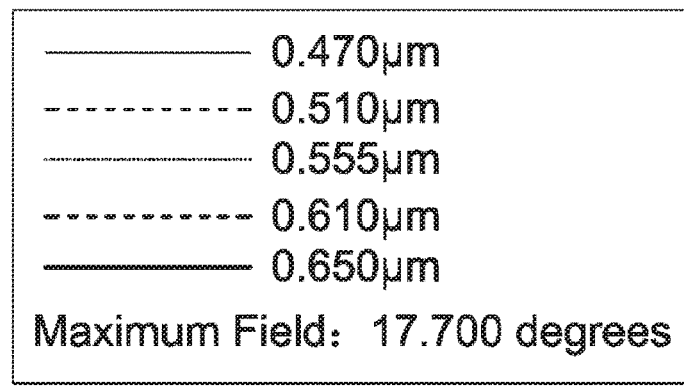
FIG. 4C is a schematic diagram illustrating the distortion of the lens assembly according to the second embodiment of the present disclosure.
Figure 4C:
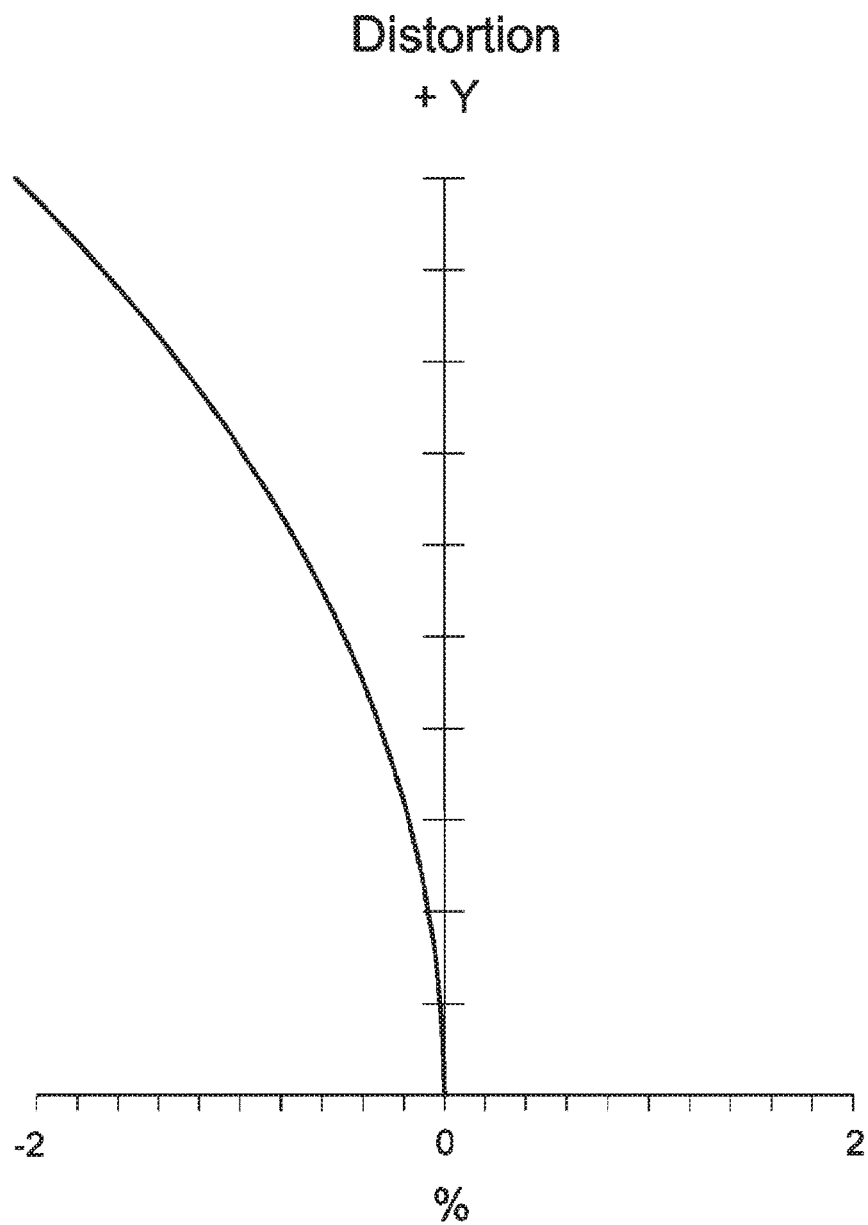
Figure 4D:
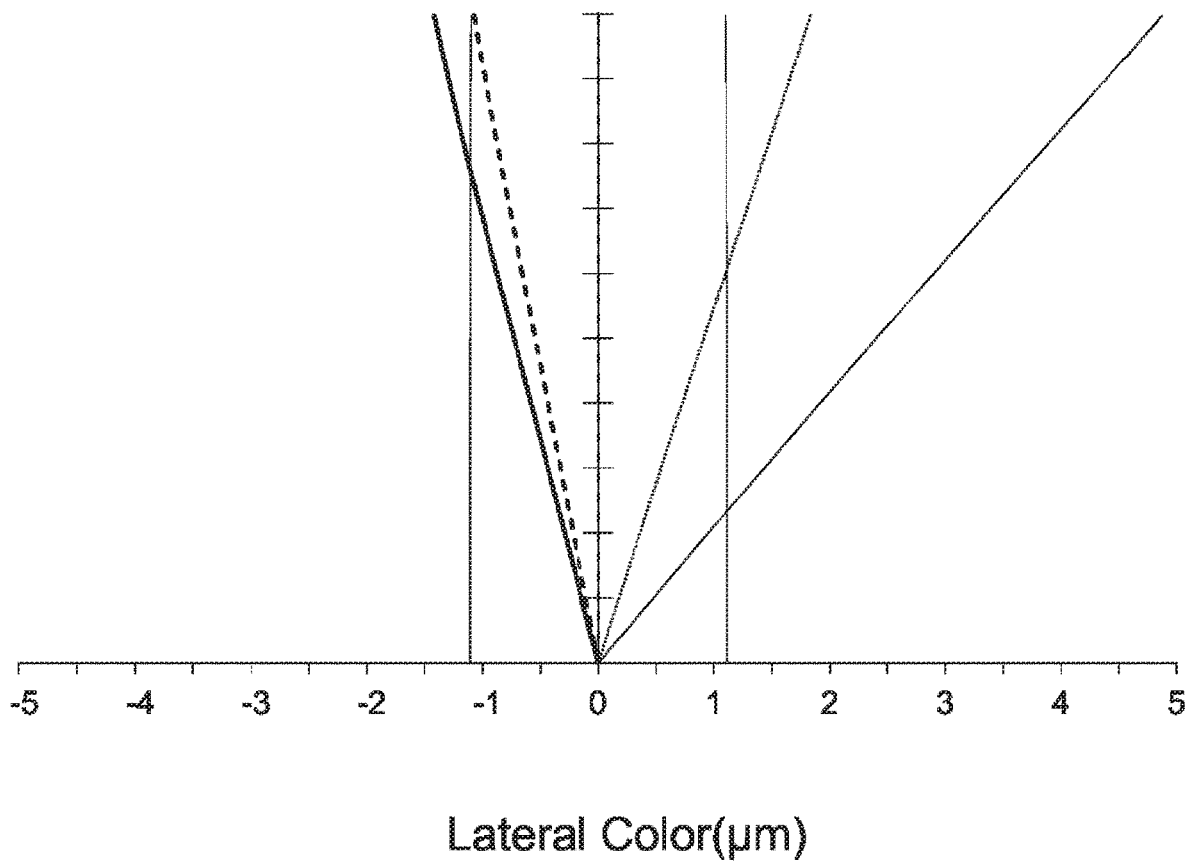
FIG. 4D is a schematic diagram illustrating the lateral color of the lens assembly according to the second embodiment of the present disclosure.
Figure 4E:
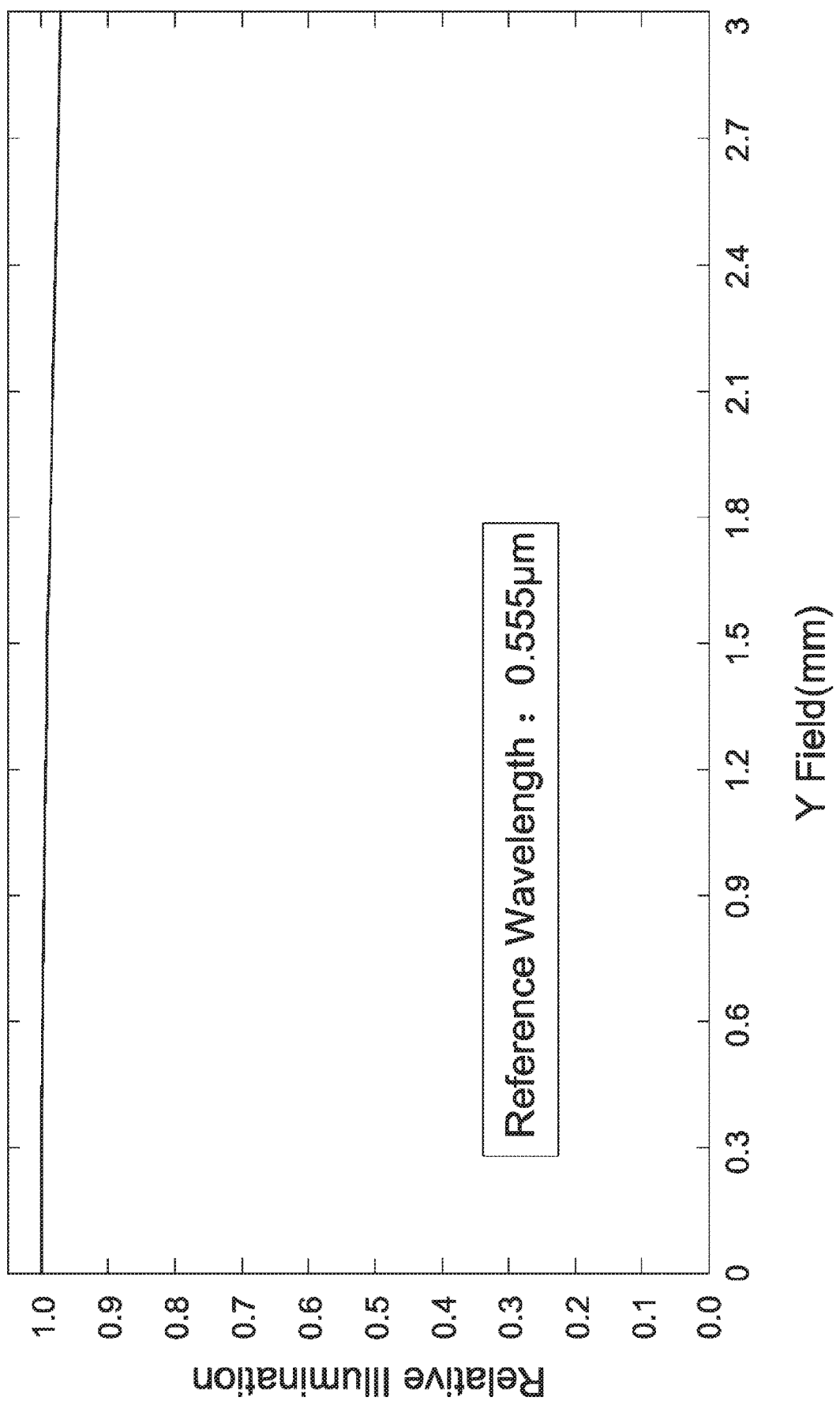
FIG. 4E is a schematic diagram illustrating the relative illumination of the lens assembly according to the second embodiment of the present disclosure.
Figure 4F:
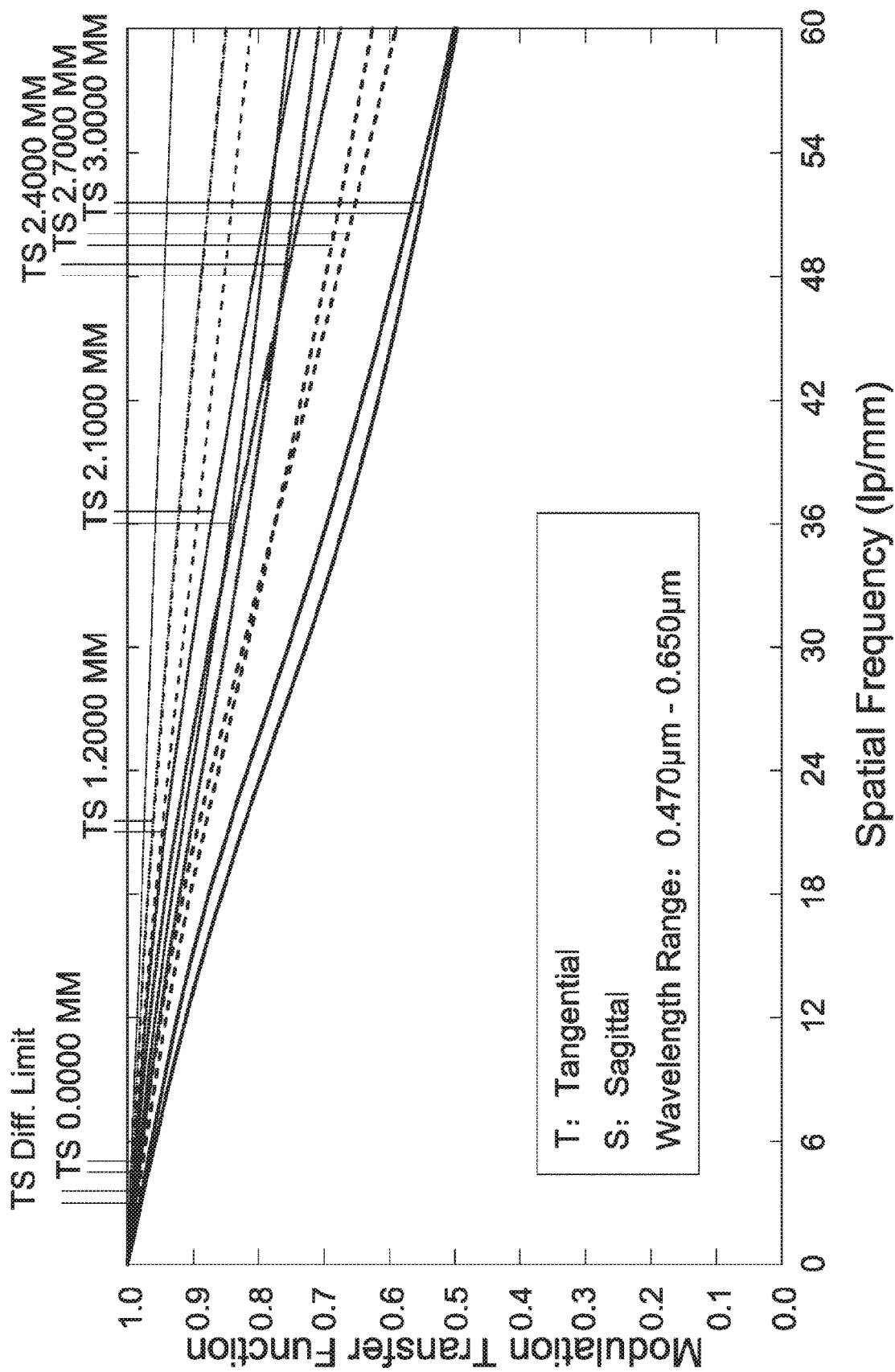
FIG. 4F is a schematic diagram illustrating the modulation transfer function of the lens assembly according to the second embodiment of the present disclosure.
Figure 4G:
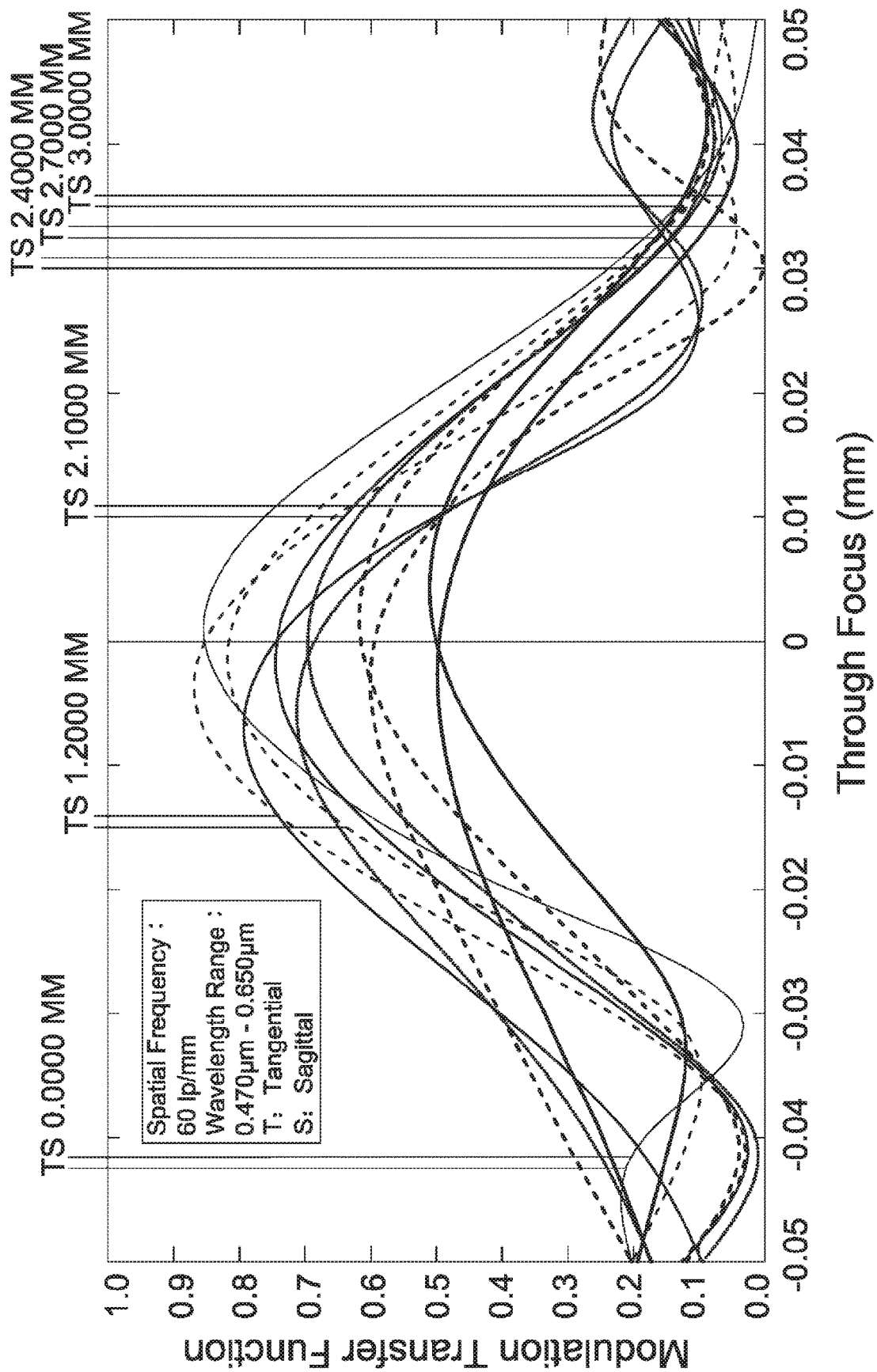
FIG. 4G is a schematic diagram illustrating the through focus modulation transfer function of the lens assembly according to the second embodiment of the present disclosure.

It can be seen from FIG. 4A that the longitudinal aberration amount in the lens assembly 2 of the second embodiment ranges from −0.02 mm to 0.04 mm. It can be seen from FIG. 4B that the field curvature amount in the lens assembly 2 of the second embodiment ranges from −0.04 mm to 0.04 mm. It can be seen from FIG. 4C that the distortion in the lens assembly 2 of the second embodiment ranges from −2.2% to 0%. It can be seen from FIG. 4D that the lateral color in the lens assembly 2 of the second embodiment ranges from −1.5 μm to 5.0 μm. It can be seen from FIG. 4E that the relative illumination in the lens assembly 2 of the second embodiment ranges from 0.98 to 1.0. It can be seen from FIG. 4F that the modulation transfer function in the lens assembly 2 of the second embodiment ranges from 0.50 to 1.0. It can be seen from FIG. 4G that the through focus modulation transfer function of tangential direction and sagittal direction in the lens assembly 2 of the second embodiment ranges from 0.0 to 0.88 as focus shift ranges from −0.05 mm to 0.05 mm.

It is obvious that the longitudinal aberration, the field curvature, the distortion and the lateral color of the lens assembly 2 of the second embodiment can be corrected effectively, and the relative illumination, the resolution and the depth of focus of the lens assembly 2 of the second embodiment can meet the requirement. Therefore, the lens assembly 2 of the second embodiment is capable of good optical performance.

Referring to FIG. 5, FIG. 5 is a lens layout and optical path diagram of a lens assembly in accordance with a third embodiment of the invention. The lens assembly 3 includes a first lens L31, a second lens L32, a third lens L33, a stop ST3, a fourth lens L34, a fifth lens L35, a sixth lens L36, an optical filter OF3, and a cover glass CG3; all of which are arranged in order from an object side to an image side along an optical axis OA3. In operation, an image of light rays from the object side is formed at an image plane IMA3.

According to the foregoing, wherein: the sixth lens L36 is a biconvex lens, wherein the image side surface S312 is a convex surface, the image side surface S312 is a spherical surface; both of the object side surface S313 and image side surface S314 of the optical filter OF3 are plane surfaces; and both of the object side surface S315 and image side surface S316 of the cover glass CG3 are plane surfaces.

With the above design of the lenses and stop ST3 and at least any one of the conditions (1)-(12) satisfied, the lens assembly 3 can have an effective decreased F-number, an effective increased resolution, an effective resisted environmental temperature change, an effective corrected aberration; and is capable of an effective corrected chromatic aberration.

Table 5 shows the optical specification of the lens assembly 3 in FIG. 5.

TABLE 5

Effective Focal Length = 9.962 mm
F-number = 2.0
Total Lens Length = 21.00 mm
Field of View = 37.5 degrees

| Surface Number | Radius of Curvature (mm) | Thickness (mm) | Nd | Vd | Effective Focal Length (mm) | Remark |
|---|---|---|---|---|---|---|
| S31 | 22.72251 | 0.50 | 1.516 | 64.14 | −17.551 | The First Lens L31 |
| S32 | 6.44289 | 0.82 | | | | |
| S33 | 10.97179 | 1.64 | 1.595 | 67.74 | 13.87 | The Second Lens L32 |
| S34 | −31.87828 | 0.02 | | | | |
| S35 | 5.70281 | 2.74 | 1.959 | 17.47 | 325.15 | The Third Lens L33 |
| S36 | 4.43331 | 0.51 | | | | |
| S37 | ∞ | 0.44 | | | | Stop ST3 |
| S38 | −6.35858 | 0.50 | 1.923 | 18.897 | −4.20 | The Fourth Lens L34 |
| S39 | 10.52660 | 3.56 | 1.871 | 40.73 | 5.359 | The Fifth Lens L35 |
| S310 | −7.11495 | 0.02 | | | | |
| S311 | 11.70883 | 1.77 | 1.786 | 44.2 | 12.8 | The Sixth Lens L36 |
| S312 | −68.64021 | 2.00 | | | | |
| S313 | ∞ | 0.21 | 1.517 | 64.17 | | Optical Filter OF3 |
| S314 | ∞ | 5.83 | | | | |
| S315 | ∞ | 0.40 | 1.517 | 64.17 | | Cover Glass CG3 |
| S316 | ∞ | 0.05 | | | | |

Table 6 shows the parameters and condition values for conditions (1)-(12) in accordance with the third embodiment of the invention. It can be seen from Table 6 that the lens assembly 3 of the third embodiment satisfies the conditions (1)-(12).

TABLE 6

| BFL | 8.484 mm | | | | |
|---|---|---|---|---|---|
| $|f_1/f|$ | 1.762 | $|f_2/f|$ | 1.393 | $|f_4/f|$ | 0.421 |
| $|f_5/f|$ | 0.538 | $|f_6/f|$ | 1.285 | $|BFL/TTL|$ | 0.404 |

TABLE 6-continued

| f + f$_1$ | −7.59 mm | f + f$_2$ | 23.84 mm | f + f$_3$ | 335.11 mm |
| f + f$_4$ | 5.77 mm | f + f$_5$ | 15.32 mm | f + f$_6$ | 22.76 mm |

By the above arrangements of the lenses and stop ST3, the lens assembly 3 of the third embodiment can meet the requirements of optical performance as seen in FIGS. 6A-6G.

Figure 6A:
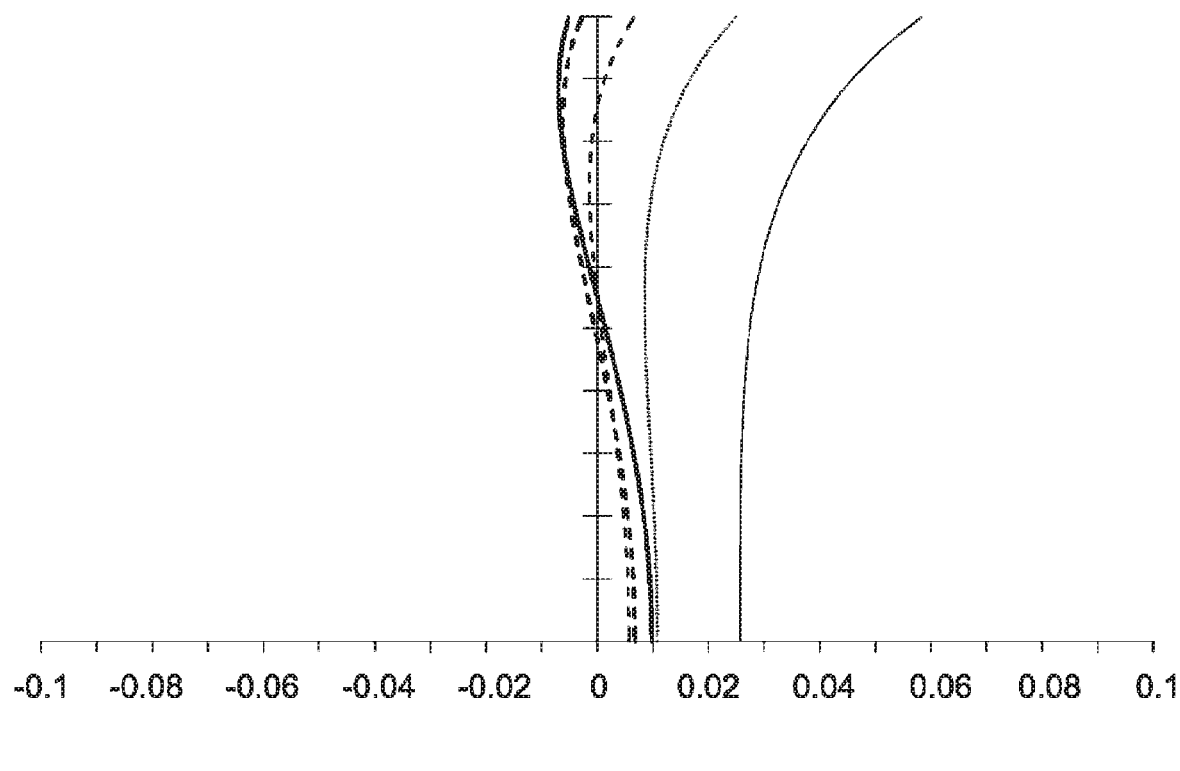
FIG. 6A is a schematic diagram illustrating the longitudinal aberration of the lens assembly according to the third embodiment of the present disclosure.
Figure 6B:
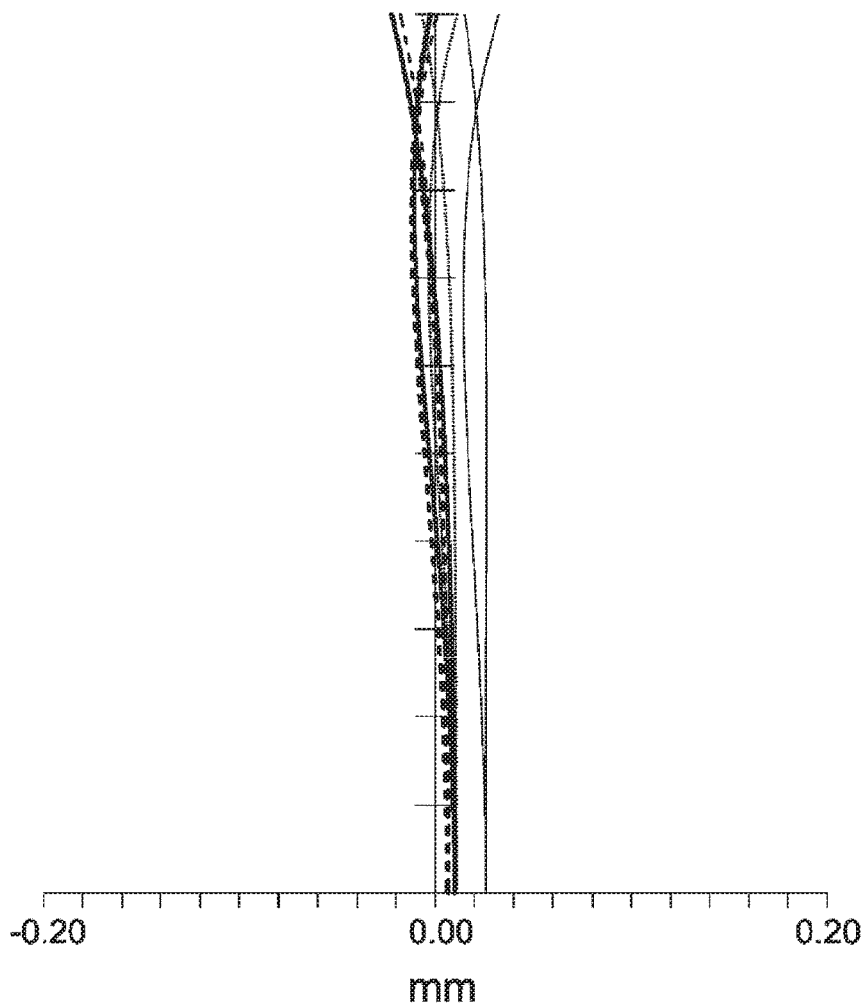
FIG. 6B is a schematic diagram illustrating the field curvature of the assembly according to the third embodiment of the present disclosure.
Figure 6C:
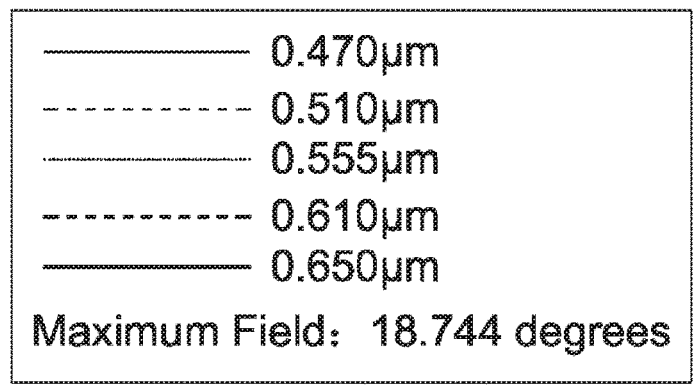
FIG. 6C is a schematic diagram illustrating the distortion of the lens assembly according to the third embodiment of the present disclosure.
Figure 6C:
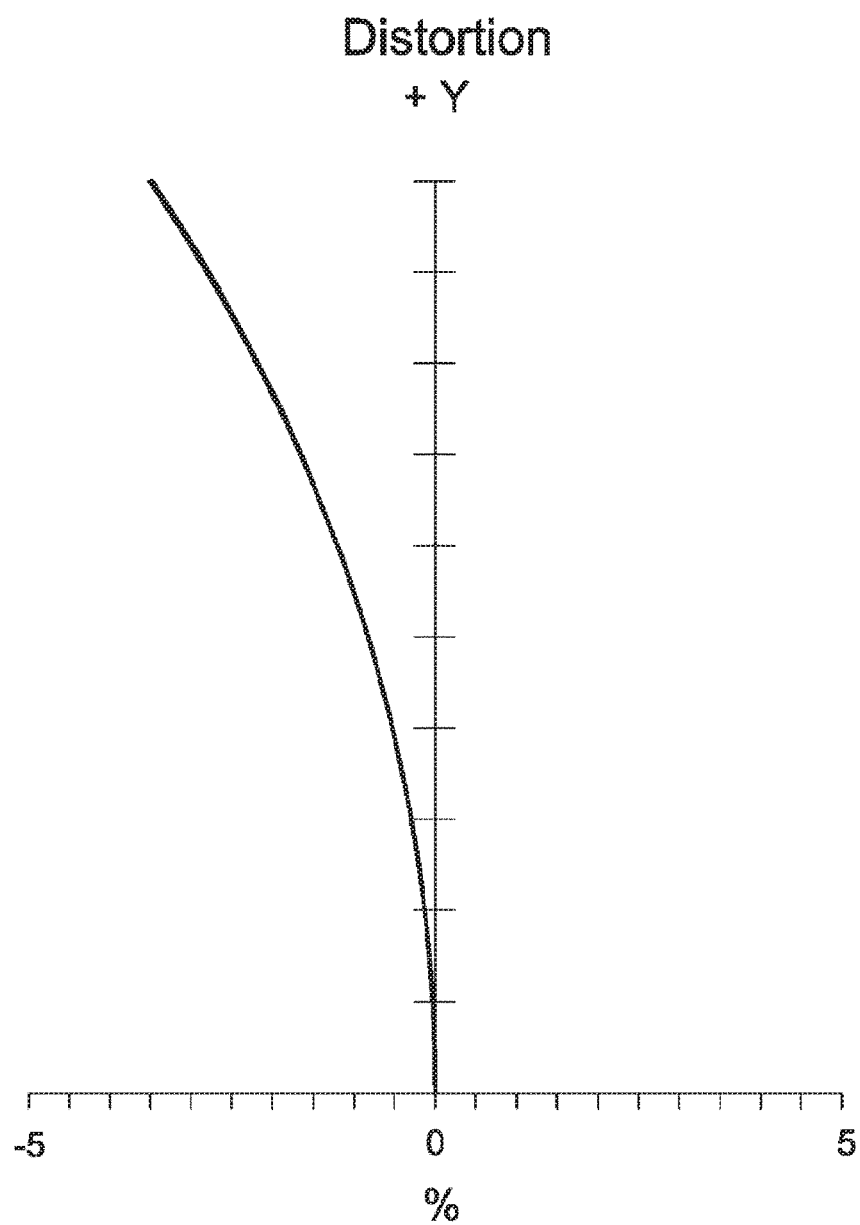
Figure 6D:
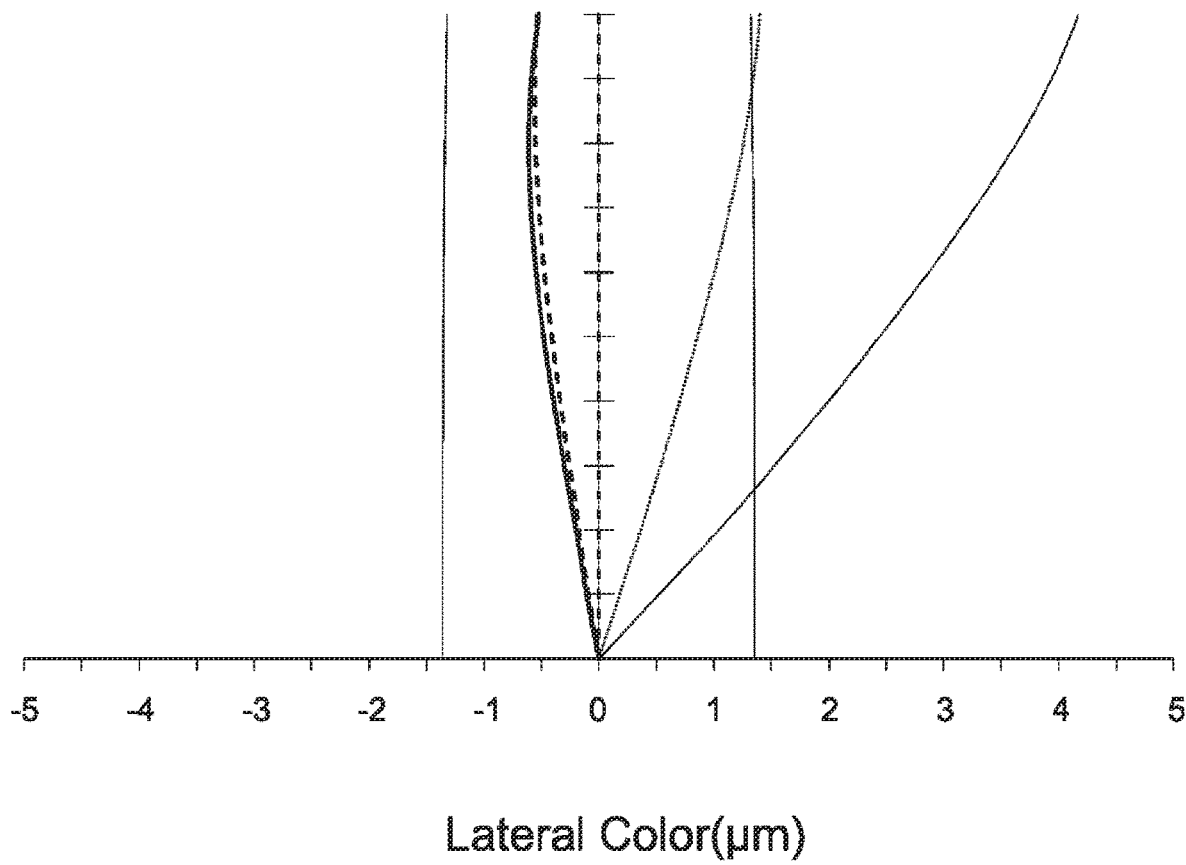
FIG. 6D is a schematic diagram illustrating the lateral color of the lens assembly according to the third embodiment of the present disclosure.
Figure 6E:
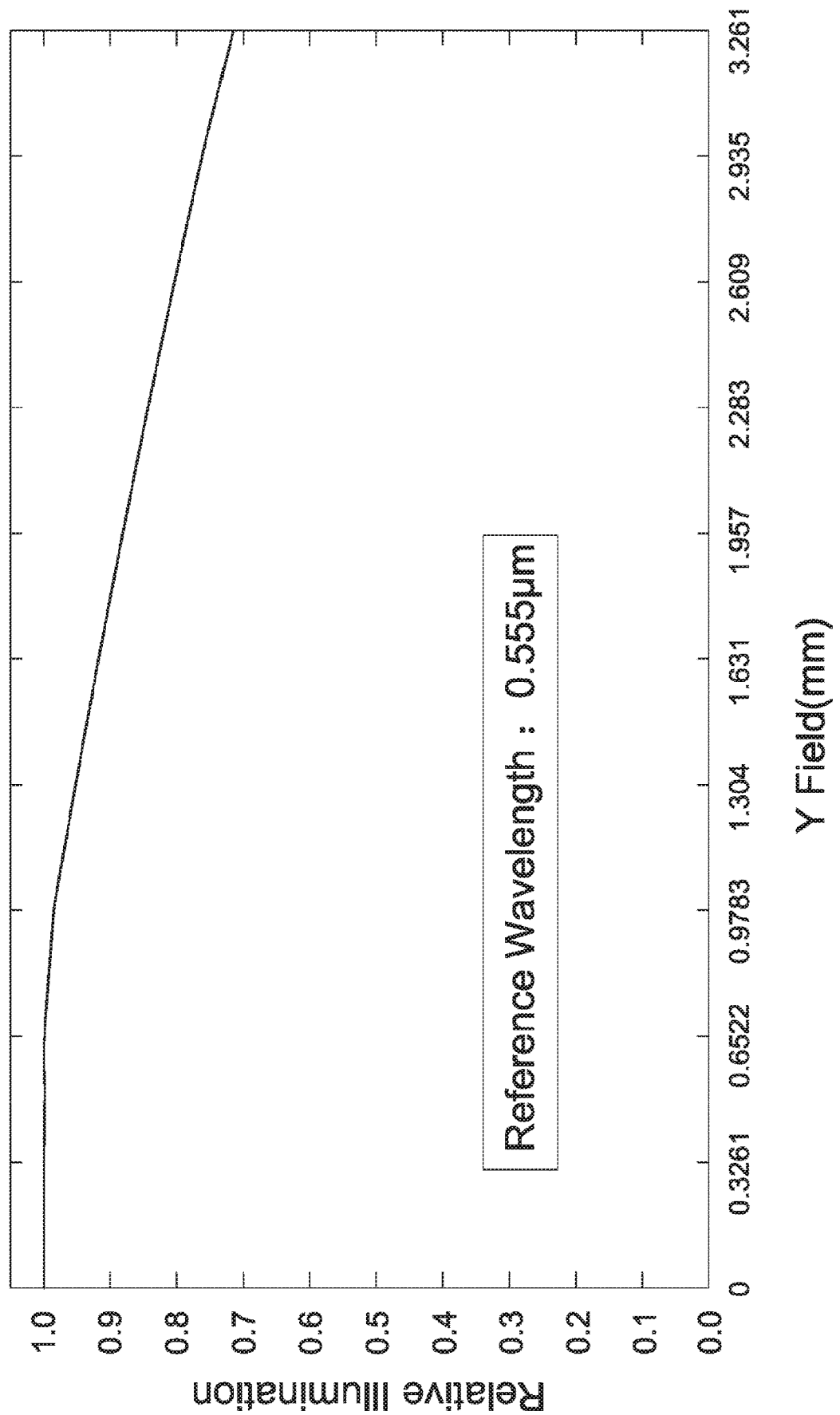
FIG. 6E is a schematic diagram illustrating the relative illumination of the lens assembly according to the third embodiment of the present disclosure.
Figure 6F:
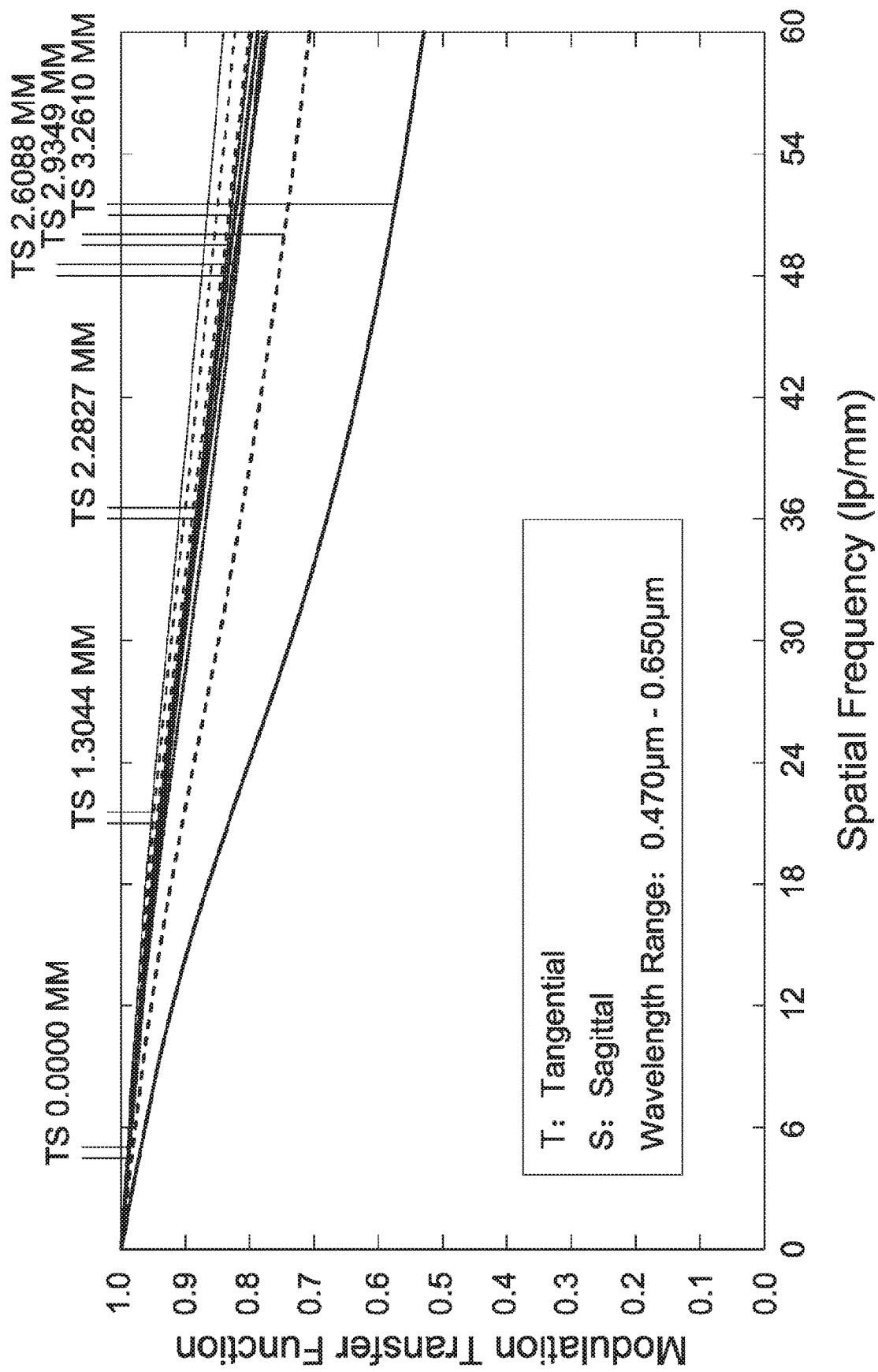
FIG. 6F is a schematic diagram illustrating the modulation transfer function of the lens assembly according to the third embodiment of the present disclosure.
Figure 6G:
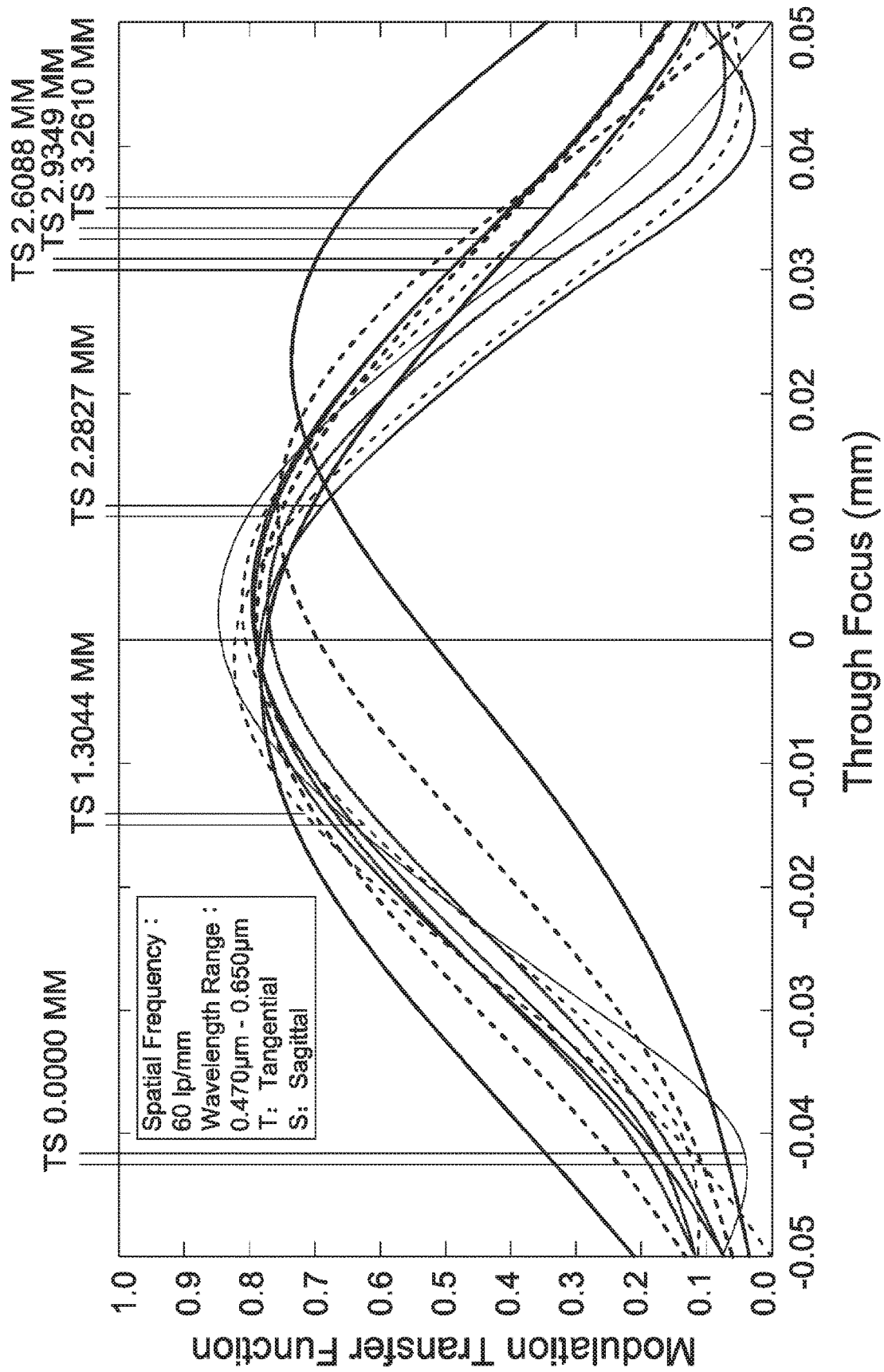
FIG. 6G is a schematic diagram illustrating the through focus modulation transfer function of the lens assembly according to the third embodiment of the present disclosure.

It can be seen from FIG. 6A that the longitudinal aberration amount in the lens assembly 3 of the third embodiment ranges from −0.01 mm to 0.06 mm. It can be seen from FIG. 6B that the field curvature amount in the lens assembly 3 of the third embodiment ranges from −0.02 mm to 0.04 mm. It can be seen from FIG. 6C that the distortion in the lens assembly 3 of the third embodiment ranges from −3.5% to 0%. It can be seen from FIG. 6D that the lateral color in the lens assembly 3 of the third embodiment ranges from −1.0 μm to 4.5 μm. It can be seen from FIG. 6E that the relative illumination in the lens assembly 3 of the third embodiment ranges from 0.72 to 1.0. It can be seen from FIG. 6F that the modulation transfer function in the lens assembly 3 of the third embodiment ranges from 0.53 to 1.0. It can be seen from FIG. 6G that the through focus modulation transfer function of tangential direction and sagittal direction in the lens assembly 3 of the third embodiment ranges from 0.0 to 0.86 as focus shift ranges from −0.05 mm to 0.05 mm.

It is obvious that the longitudinal aberration, the field curvature, the distortion and the lateral color of the lens assembly 3 of the third embodiment can be corrected effectively, and the relative illumination, the resolution and the depth of focus of the lens assembly 3 of the third embodiment can meet the requirement. Therefore, the lens assembly 3 of the third embodiment is capable of good optical performance.

It should be understood that although the present disclosure has been described with reference to the above preferred embodiments, these embodiments are not intended to retrain the present disclosure. It will be apparent to one of ordinary skill in the art that various changes or modifications to the described embodiments can be made without departing from the spirit of the present disclosure. Accordingly, the scope of the present disclosure is defined by the attached claims.

What is claimed is:

1. A lens assembly, in sequence from an object side to an image side along an optical axis, comprising:
    a first lens with negative refractive power, which includes a convex surface facing the object side;
    a second lens with positive refractive power;
    a third lens with positive refractive power;
    a fourth lens with negative refractive power;
    a fifth lens with positive refractive power; and
    a sixth lens with positive refractive power, which includes a convex surface facing the object side;
    wherein the lens assembly satisfies:

$0.2<|f_5/f|<1.5$;

wherein $f_5$ is a focal length in mm of the fifth lens and f is an effective focal length in mm of the lens assembly;
    wherein the lens assembly satisfies at least one of following conditions:
    24 mm<f+f$_2$<25 mm;
    103.7 mm<f+f$_3$<199.8 mm;
    4.5 mm<f+f$_4$<5.7 mm;
    14.5 mm<f+f$_5$<15 mm;
    wherein f$_2$ is an effective focal length in mm of the second lens, f$_3$ is an effective focal length in mm of the third lens, and f$_4$ is an effective focal length in mm of the fourth lens.

2. The lens assembly as claimed in claim 1, wherein the fifth lens further comprises a convex surface facing the object side and a convex surface facing the image side.

3. The lens assembly as claimed in claim 1, wherein the fourth lens further comprises a concave surface facing the object side and a concave surface facing the image side.

4. The lens assembly as claimed in claim 1, wherein:
    the second lens further comprises a convex surface facing the object side and a convex surface facing the image side; and
    the third lens further comprises a convex surface facing the object side and a concave surface facing the image side.

5. The lens assembly as claimed in claim 1, wherein the first lens further comprises a concave surface facing the image side.

6. The lens assembly as claimed in claim 1, wherein the sixth lens further comprises a convex surface facing the image side.

7. The lens assembly as claimed in claim 1, wherein the sixth lens further comprises a plane surface facing the image side.

8. The lens assembly as claimed in claim 1, wherein further comprising a stop disposed between the third lens and the fourth lens, the fourth lens and the fifth lens are cemented together.

9. The lens assembly as claimed in claim 1, wherein the lens assembly satisfies at least one of the following conditions:
    $0.8<|f_1/f|<2.9$;
    $0.5<|f_2/f|<2.6$;
    $0.2<|f_4/f|<1.5$;
    $0.3<|f_6/f|<2.4$;
    $0.1<|BFL/TTL|<0.6$;
    wherein f$_1$ is an effective focal length in mm of the first lens, f$_2$ is an effective focal length in mm of the second lens, f$_4$ is an effective focal length in mm of the fourth lens, f$_6$ is an effective focal length in mm of the sixth lens, f is an effective focal length in mm of the lens assembly, BFL is an interval in mm from an image side surface of the sixth lens to the image plane along the optical axis, and TTL is an interval in mm from an object side surface of the first lens to the image plane along the optical axis.

10. The lens assembly as claimed in claim 1, wherein the lens assembly satisfies at least one of the following conditions:
    −10 mm<f+f$_1$<−7 mm;
    21.2 mm<f+f$_6$<23.6 mm;
    wherein f$_1$ is an effective focal length in mm of the first lens, f$_6$ is an effective focal length in mm of the sixth lens, and f is an effective focal length in mm of the lens assembly.

11. A lens assembly, in sequence from an object side to an image side along an optical axis, comprising:
    a first lens with negative refractive power, which includes a convex surface facing the object side;
    a second lens with positive refractive power;
    a third lens with positive refractive power;
    a fourth lens with negative refractive power;
    a fifth lens with positive refractive power; and
    a sixth lens with positive refractive power, which includes a convex surface facing the object side;

wherein the lens assembly satisfies:

21.2 mm<f+$f_6$<23.6 mm;

wherein $f_6$ is a focal length in mm of the sixth lens and f is an effective focal length in mm of the lens assembly;

wherein the lens assembly satisfies at least one of following conditions:

24 mm<f+$f_2$<25 mm;

103.7 mm<f+$f_3$<199.8 mm;

4.5 mm<f+$f_4$<5.7 mm;

14.5 mm<f+$f_5$<15 mm;

wherein $f_2$ is an effective focal length in mm of the second lens, $f_3$ is an effective focal length in mm of the third lens, $f_4$ is an effective focal length in mm of the fourth lens, and $f_5$ is an effective focal length in mm of the fifth lens.

12. The lens assembly as claimed in claim 11, wherein the fifth lens further comprises a convex surface facing the object side and a convex surface facing the image side.

13. The lens assembly as claimed in claim 11, wherein the fourth lens further comprises a concave surface facing the object side and a concave surface facing the image side.

14. The lens assembly as claimed in claim 11, wherein:
the second lens further comprises a convex surface facing the object side and a convex surface facing the image side; and
the third lens further comprises a convex surface facing the object side and a concave surface facing the image side.

15. The lens assembly as claimed in claim 11, wherein the first lens further comprises a concave surface facing the image side.

16. The lens assembly as claimed in claim 11, wherein the sixth lens further comprises a convex surface facing the image side.

17. The lens assembly as claimed in claim 11, wherein the sixth lens further comprises a plane surface facing the image side.

18. The lens assembly as claimed in claim 11, wherein further comprising a stop disposed between the third lens and the fourth lens, the fourth lens and the fifth lens are cemented together.

19. The lens assembly as claimed in claim 11, wherein the lens assembly satisfies at least one of the following conditions:

0.8<|$f_1$/f|<2.9;

0.5<|$f_2$/f|<2.6;

0.2<|$f_4$/f|<1.5;

0.2<|$f_5$/f|<1.5;

0.3<|$f_6$/f|<2.4;

0.1<|BFL/TTL|<0.6;

wherein $f_1$ is an effective focal length in mm of the first lens, $f_2$ is an effective focal length in mm of the second lens, $f_4$ is an effective focal length in mm of the fourth lens, $f_5$ is an effective focal length in mm of the fifth lens, $f_6$ is an effective focal length in mm of the sixth lens, f is an effective focal length in mm of the lens assembly, BFL is an interval in mm from an image side surface of the sixth lens to the image plane along the optical axis, and TTL is an interval in mm from an object side surface of the first lens to the image plane along the optical axis.

20. The lens assembly as claimed in claim 11, wherein the lens assembly satisfies following conditions:

−10 mm<f+$f_1$<−7 mm;

wherein $f_1$ is an effective focal length in mm of the first lens and f is an effective focal length in mm of the lens assembly.

* * * * *